(12) United States Patent
Hanna et al.

(10) Patent No.: US 11,999,117 B2
(45) Date of Patent: Jun. 4, 2024

(54) APPARATUS AND METHODS FOR REPAIRING COMPOSITE LAMINATES

(71) Applicant: SHORT BROTHERS PLC, Belfast (GB)

(72) Inventors: Samuel Colin Hanna, Bangor Down (GB); William Christopher Campbell, Antrim (GB); Mathew Stoessiger, Savannah, GA (US); Michael Crossthwaite, Elsternwick (AU)

(73) Assignee: Short Brothers PLC, Belfast (GB)

( * ) Notice: Subject to any disclaimer, the term of this patent is extended or adjusted under 35 U.S.C. 154(b) by 0 days.

(21) Appl. No.: 17/562,322

(22) Filed: Dec. 27, 2021

(65) Prior Publication Data
US 2022/0118721 A1 Apr. 21, 2022

Related U.S. Application Data

(62) Division of application No. 16/087,920, filed as application No. PCT/US2017/023512 on Mar. 22, 2017, now Pat. No. 11,235,540.

(60) Provisional application No. 62/313,271, filed on Mar. 25, 2016.

(51) Int. Cl.
*B29C 70/44* (2006.01)
*B29C 70/74* (2006.01)
*B29C 73/02* (2006.01)

(52) U.S. Cl.
CPC .......... *B29C 70/443* (2013.01); *B29C 70/745* (2013.01); *B29C 73/02* (2013.01)

(58) Field of Classification Search
CPC ..... B29C 70/443; B29C 70/745; B29C 73/02; B29C 70/549
See application file for complete search history.

(56) References Cited

U.S. PATENT DOCUMENTS

| 5,868,886 | A | 2/1999 | Alston et al. |
| 6,385,836 | B1 | 5/2002 | Coltrin |
| 6,818,159 | B2 | 11/2004 | Hinz |

(Continued)

FOREIGN PATENT DOCUMENTS

| EP | 2404743 A1 | 11/2012 |
| EP | 2871047 A1 | 5/2015 |

(Continued)

OTHER PUBLICATIONS

Chinese Office Action dated Feb. 3, 2020, for Chinese Patent Application No. 201780019723.8.

(Continued)

*Primary Examiner* — S. Behrooz Ghorishi
(74) *Attorney, Agent, or Firm* — Stinson LLP

(57) ABSTRACT

The disclosure discloses apparatus and methods for repairing defects such as porosity and/or edge delamination in composite laminates by infusion of flowable matrix material. In some embodiments, methods disclosed herein comprise infusing the flowable matrix material into a space in the composite laminate through the use of a formed hole extending at least partially through the composite laminate. In some embodiments, methods disclosed herein comprise infusing the flowable matrix material into a space in the composite laminate in a stepwise manner in order to obtain more complete filling of such space.

20 Claims, 16 Drawing Sheets

(56) References Cited

U.S. PATENT DOCUMENTS

| | | |
|---|---|---|
| 7,255,549 B2 | 8/2007 | Hadley |
| 8,091,229 B2 | 1/2012 | Deak et al. |
| 8,945,321 B2 | 2/2015 | Hanks et al. |
| 9,156,208 B2 | 10/2015 | Heim et al. |
| 9,579,873 B2 | 2/2017 | Hanks et al. |
| 11,235,540 B2 | 2/2022 | Hanna et al. |
| 2002/0020934 A1* | 2/2002 | Hinz .................... B29C 70/443 264/102 |
| 2014/0216634 A1* | 8/2014 | Hanks .................... B29C 73/10 156/578 |
| 2014/0224410 A1* | 8/2014 | Millar .................... F16B 35/00 156/92 |

FOREIGN PATENT DOCUMENTS

| | | |
|---|---|---|
| EP | 3433089 | 12/2021 |
| WO | 2017/165475 | 9/2017 |

OTHER PUBLICATIONS

International Search Report and Written Opinion dated Sep. 13, 2017, for International Patent Application No. PCT/US2021/023512.

International Preliminary Report on Patentability dated Sep. 25, 2018, for International Patent Application No. PCT/US2017/023512.

Canadian Search Report in related CA Application 3018715 dated Apr. 3, 2023, 4 pages.

\* cited by examiner

400 ⬎

SUPPLYING FLOWABLE MATRIX MATERIAL TO A FIRST PORTION OF AN AREA OF THE SURFACE OF THE COMPOSITE LAMINATE OVERLAYING A POROUS REGION.
402

DISTRIBUTING THE FLOWABLE MATRIX MATERIAL ACROSS THE FIRST PORTION OF THE AREA.
404

WHILE HINDERING A FLOW OF THE FLOWABLE MATRIX MATERIAL OUT OF THE FIRST PORTION OF THE AREA VIA THE SURFACE OF THE COMPOSITE LAMINATE:

- DRAWING THE FLOWABLE MATRIX MATERIAL IN THE FIRST PORTION OF THE AREA INTO THE POROUS REGION; AND

- CAUSING SOME OF THE FLOWABLE MATRIX MATERIAL TO EXIT THE POROUS REGION VIA A SECOND PORTION OF THE AREA OUTSIDE THE FIRST PORTION OF THE AREA.
406

```
┌─────────────────────────────────────────────────────────────────────┐
│ INFUSING A FLOWABLE MATRIX MATERIAL INTO A SPACE IN THE COMPOSITE   │
│ LAMINATE AND INTO A PASSAGEWAY DEFINED BETWEEN A STRUCTURAL         │
│ PIN DISPOSED IN A HOLE EXTENDING AT LEAST PARTIALLY THROUGH THE     │
│ COMPOSITE LAMINATE, AND, A WALL OF THE HOLE.                        │
│                               902                                    │
└─────────────────────────────────────────────────────────────────────┘
                                  │
                                  ▼
┌─────────────────────────────────────────────────────────────────────┐
│ CURING THE FLOWABLE MATRIX MATERIAL INFUSED INTO THE SPACE AND      │
│ INTO THE PASSAGEWAY WHILE THE STRUCTURAL PIN IS IN THE HOLE.        │
│                               904                                    │
└─────────────────────────────────────────────────────────────────────┘
```

Fig. 9

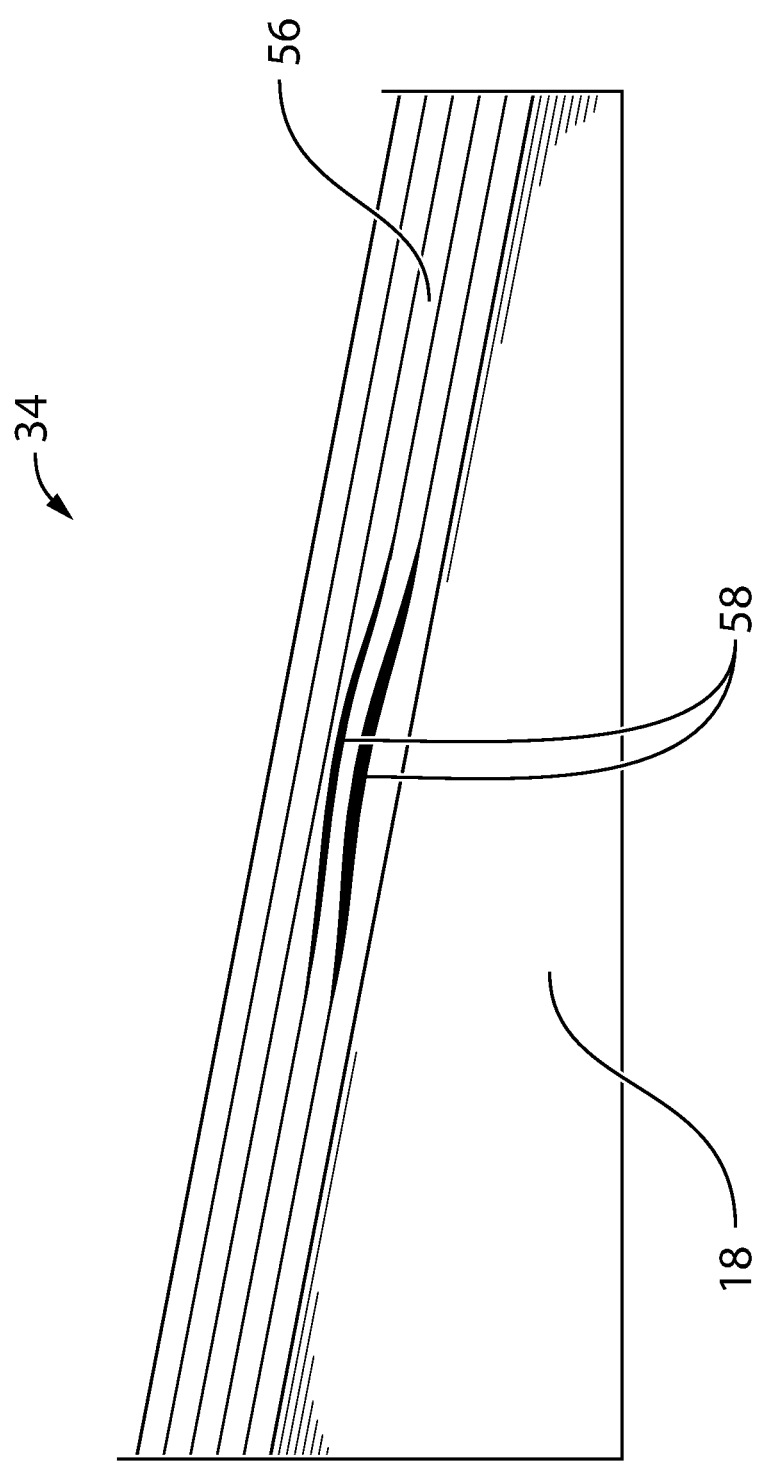

1500 ⤴

┌─────────────────────────────────────────────────────────────────────┐
│ SUPPLYING FLOWABLE MATRIX MATERIAL AT A LOCATION OF AN EDGE OF THE  │
│ COMPOSITE LAMINATE IN FLUID COMMUNICATION WITH A SPACE ASSOCIATED   │
│ WITH THE DELAMINATION.                                              │
│ 1502                                                                │
└─────────────────────────────────────────────────────────────────────┘
                                    ↓
┌─────────────────────────────────────────────────────────────────────┐
│ INFUSING FLOWABLE MATRIX MATERIAL INTO THE SPACE ASSOCIATED WITH    │
│ THE DELAMINATION IN THE COMPOSITE LAMINATE USING A PRESSURE         │
│ DIFFERENTIAL BETWEEN THE EDGE LOCATION AND A FIRST INBOARD          │
│ LOCATION IN THE COMPOSITE LAMINATE, THE FIRST INBOARD LOCATION      │
│ BEING IN FLUID COMMUNICATION WITH THE EDGE LOCATION VIA THE SPACE   │
│ IN THE COMPOSITE LAMINATE ASSOCIATED WITH THE DELAMINATION.         │
│ 1504                                                                │
└─────────────────────────────────────────────────────────────────────┘
                                    ↓
┌─────────────────────────────────────────────────────────────────────┐
│ CURING THE FLOWABLE MATRIX MATERIAL INFUSED INTO THE SPACE IN THE   │
│ COMPOSITE LAMINATE ASSOCIATED WITH THE EDGE DELAMINATION.           │
│ 1506                                                                │
└─────────────────────────────────────────────────────────────────────┘

INFUSING THE FLOWABLE MATRIX MATERIAL INTO THE SPACE ASSOCIATED WITH THE EDGE DELAMINATION IN THE COMPOSITE LAMINATE USING A PRESSURE DIFFERENTIAL BETWEEN A FIRST INBOARD LOCATION ON THE COMPOSITE LAMINATE AND AN EDGE LOCATION ON THE COMPOSITE LAMINATE, THE FIRST INBOARD LOCATION BEING IN FLUID COMMUNICATION WITH THE EDGE LOCATION VIA THE SPACE IN THE COMPOSITE LAMINATE.
1602

CURING THE FLOWABLE MATRIX MATERIAL INFUSED INTO THE SPACE IN THE COMPOSITE LAMINATE ASSOCIATED WITH THE EDGE DELAMINATION.
1604

SUPPLYING FLOWABLE MATRIX MATERIAL AT AN INLET LOCATION ON THE COMPOSITE LAMINATE, THE INLET LOCATION BEING IN FLUID COMMUNICATION WITH A SPACE INSIDE THE COMPOSITE LAMINATE.
1702

INFUSING THE FLOWABLE MATRIX MATERIAL INTO THE SPACE IN THE COMPOSITE LAMINATE USING A PRESSURE DIFFERENTIAL BETWEEN THE INLET LOCATION AND A FIRST LOCATION IN THE COMPOSITE LAMINATE, THE FIRST LOCATION BEING IN FLUID COMMUNICATION WITH THE INLET LOCATION VIA THE SPACE IN THE COMPOSITE LAMINATE.
1704

CEASING TO INFUSE THE FLOWABLE MATRIX MATERIAL INTO THE SPACE USING THE FIRST LOCATION.
1706

INFUSING THE FLOWABLE MATRIX MATERIAL INTO THE SPACE IN THE COMPOSITE LAMINATE USING A PRESSURE DIFFERENTIAL BETWEEN THE INLET LOCATION AND A SECOND LOCATION ON THE COMPOSITE LAMINATE, THE SECOND LOCATION BEING IN FLUID COMMUNICATION WITH THE INLET LOCATION VIA THE SPACE IN THE COMPOSITE LAMINATE.
1708

CEASING TO INFUSE THE FLOWABLE MATRIX MATERIAL INTO THE SPACE USING THE SECOND LOCATION.
1710

Fig.17

APPARATUS AND METHODS FOR REPAIRING COMPOSITE LAMINATES

RELATED APPLICATIONS

The present application is a divisional application and claims priority of application entitled "APPARATUS AND METHODS FOR REPAIRING COMPOSITE LAMINATES", Ser. No. 16/087,920, filed on Sep. 24, 2018, which is the U.S. National Stage filing of International Patent Application No. PCT/US2017/023512, filed on Mar. 22, 2017, and entitled "APPARATUS AND METHODS FOR REPAIRING COMPOSITE LAMINATES", which claims the priority benefit of U.S. Provisional Patent Application Ser. No. 62/313,271 filed on Mar. 25, 2016, and entitled "APPARATUS AND METHODS FOR REPAIRING COMPOSITE LAMINATES," each of which is incorporated by reference in its entirety.

TECHNICAL FIELD

The disclosure relates generally to repairing composite laminates, and more particularly to repairing defects such as porosity and/or edge delamination in composite laminates by infusion of flowable matrix material.

BACKGROUND OF THE ART

When manufacturing composite laminates, damage can occur to such laminates during processing or subsequent handling. For example, relatively heavy surface porosity extending up to about 40% through the thickness of a composite laminate can occur due to a processing error during manufacturing (e.g., resin transfer infusion). Also, handling accidents such as an impact to an edge of a composite laminate can result in edge delamination.

Methods for repairing these types of damage exist. For example, with respect to repairing porosity, a resin of suitable viscosity can be spread over the surface of the laminate to restore the cosmetic appearance and hinder moisture ingress into the composite laminate. Such repair method is also known as a "resin rub" on the surface of the composite laminate and typically only wets the outer surface ply of the composite laminate and seals the porosity within the component. Such resin rub is typically not considered a structural repair because porosity can still be present below the outer surface of the composite laminate. Such resin rub can also require a significant amount of rework to restore an acceptable surface finish for the composite laminate.

With respect to edge delamination, one known method includes the manual introduction of resin into the delamination using a hypodermic syringe for example and the subsequent clamping of the affected region of the composite laminate during curing. This type of repair may not always completely fill the space in the composite laminate associated with the delamination with resin and therefore may not restore the structural performance of the composite laminate. Improvement is desirable.

SUMMARY OF THE INVENTION

In one aspect, the disclosure describes an apparatus for infusing a flowable matrix material into a porous region in a composite laminate via a surface of the composite laminate. The apparatus comprises:

a vacuum barrier covering at least a first portion of an area of the surface of the composite laminate overlaying a location of the porous region in the composite laminate, the vacuum barrier defining an enclosed volume comprising the first portion of the area of the surface of the composite laminate;

a supply of flowable matrix material available to the first portion of the area of the surface of the composite laminate;

a flow barrier hindering a flow of the flowable matrix material out of the first portion of the area via the surface of the composite laminate; and a vacuum source in fluid communication with the enclosed volume and configured to cause the flowable matrix material in the first portion of the area to be drawn into the porous region, the vacuum source being in fluid communication with a second portion of the area outside the first portion of the area to draw the flowable matrix material out of the porous region via the second portion of the area.

The vacuum barrier may also cover the second portion of the area and the enclosed volume may include the second portion of the area.

The apparatus may comprise:

a first carrier configured to facilitate the distribution of flowable matrix material across at least some of the first portion of the area; and a second carrier configured to facilitate the flow of flowable matrix material exiting the second portion of the area toward the vacuum source.

The flow barrier may comprise a gap between the first carrier and the second carrier.

The flow barrier may comprise a release film overlaying the first and second carriers and extending across the gap between the first carrier and the second carrier.

The composite laminate may comprise a formed hole extending at least partially through the composite laminate from the surface inside the first portion of the area to facilitate the infusion of flowable matrix material into the porous region. The apparatus may comprise a structural pin extending into the formed hole where the structural pin may be configured to define a passageway for the flowable matrix material between the structural pin and a wall of the formed hole.

The structural pin may protrude from the surface of the composite laminate.

The structural pin may comprise fibrous material.

The apparatus may comprise a flexible caul plate disposed inside the enclosed volume.

In another aspect, the disclosure describes a method for infusing a flowable matrix material into a porous region in a composite laminate via a surface of the composite laminate where the surface comprises an area overlaying a location of the porous region in the composite laminate. The method may comprise:

supplying the flowable matrix material to a first portion of the area of the surface of the composite laminate;

distributing the flowable matrix material across at least some of the first portion of the area of the surface; and while hindering a flow of the flowable matrix material out of the first portion of the area via the surface of the composite laminate, drawing the flowable matrix material in the first portion of the area into the porous region and causing some of the flowable matrix material to exit the porous region via a second portion of the area outside the first portion of the area.

The method may comprise:

using a vacuum source to draw the flowable matrix material into the porous region; and facilitating the flow of flowable matrix material exiting the porous region via the second portion away from the second portion.

The method may comprise forming a hole through the surface of the composite laminate in the first portion of the area defining the location of the porous region where the hole is formed before drawing the flowable matrix material to facilitate the drawing of flowable matrix material into the porous region.

The method may comprise providing a structural pin in the formed hole where a passageway for the flowable matrix material is defined between the structural pin and a wall of the formed hole where the structural pin is provided before drawing the flowable matrix material.

The method may comprise curing the flowable matrix material drawn into the porous region and that has entered the formed hole, while the structural pin is in the formed hole.

The method may comprise detecting some of the flowable matrix material exiting the porous region via the second portion of the area and ceasing the drawing after having detected some of the flowable matrix material having exited the porous region via the second portion.

In another aspect, the disclosure describes a method for repairing a composite laminate by infusion of a flowable matrix material. The method may comprise:

infusing the flowable matrix material into a space in the composite laminate and into a passageway in fluid communication with the space, the passageway being defined between a structural pin disposed in a formed hole extending at least partially through the composite laminate, and, a wall of the formed hole; and curing the flowable matrix material infused into the space and into the passageway while the structural pin is in the formed hole.

A ratio of a diameter of the structural pin over a diameter of the formed hole may be about ⅔.

The formed hole and the structural pin may extend through two or more plies of the composite laminate.

The method may comprise infusing the flowable matrix material into the space in the composite laminate via the passageway.

The method may comprise infusing the flowable matrix material into the passageway via the space in the composite laminate.

The method may comprise detecting some of the flowable matrix material having entered the passageway and ceasing to infuse the flowable matrix material into the space after having detected some of the flowable matrix material having entered the passageway.

In another aspect, the disclosure describes a composite laminate comprising:

a volume of cured flowable matrix material infused into the composite laminate, the volume of cured flowable matrix material comprising a column of cured flowable matrix material extending at least partially through the composite laminate; and a structural pin disposed in the column of cured flowable matrix material.

The structural pin may extend generally along the column of cured flowable matrix material and has an outer diameter that is smaller than a diameter of the column of cured flowable matrix material.

A ratio of the diameter of the structural pin over the diameter of the column may be about ⅔.

The structural pin may comprise a fibrous material.

The column of cured flowable matrix material and the structural pin may extend through two or more plies of the composite laminate.

In another aspect, the disclosure describes an apparatus for repairing edge delamination in a composite laminate by infusion of a flowable matrix material via an edge of the composite laminate. The apparatus comprises:

a supply of flowable matrix material coupled to a space in the composite laminate associated with the edge delamination via the edge of the composite laminate; and a first vacuum source coupled to the space in the composite laminate associated with the edge delamination via a first hole in a face of the composite laminate for causing the flowable matrix material to flow from the edge of the composite laminate into the first hole via the space associated with the edge delamination.

The first vacuum source or a second vacuum source may be coupled to the space in the composite laminate associated with the edge delamination via a second hole in the face of the composite laminate for causing the flowable matrix material to flow from the edge of the composite laminate into the second hole via the space associated with the edge delamination.

The first hole may be at a first distance from the edge and the second hole may be at a second distance from the edge where the second distance may be greater than the first distance.

The apparatus may comprise a first vacuum barrier covering a first area of the face of the composite laminate. The first vacuum barrier may define a first enclosed volume in fluid communication with the space in the composite laminate associated with the edge delamination via a plurality of first holes in the face of the composite laminate.

The apparatus may comprise a second vacuum barrier covering a second area of the face of the composite laminate where the second area is different from the first area. The second vacuum barrier may define a second enclosed volume in fluid communication with the space in the composite laminate associated with the edge delamination via a plurality of second holes in the face of the composite laminate.

The first vacuum source may be coupled to the space in the composite laminate associated with the edge delamination via a first valve actuatable from an open to a closed position substantially preventing fluid flow via the first hole.

In another aspect, the disclosure describes a method for repairing edge delamination in a composite laminate by infusion of a flowable matrix material. The method comprises:

infusing the flowable matrix material into the space associated with the edge delamination in the composite laminate using a pressure differential between a first inboard location on the composite laminate and an edge location on the composite laminate, the first inboard location being in fluid communication with the edge location via the space in the composite laminate; and curing the flowable matrix material infused into the space in the composite laminate associated with the edge delamination.

The method may comprise infusing the flowable matrix material into the space via the edge location.

The method may comprise lowering a pressure at the first inboard location relative to a pressure at the edge location to draw the flowable matrix material from the edge location toward the first inboard location.

The method may comprise lowering the pressure at the first inboard location via a hole extending at least partially through the composite laminate from a face of the composite laminate.

The method may comprise infusing the flowable matrix material into the hole.

The structural pin may extend into the hole and the flowable matrix material may be infused into a passageway defined between a wall of the hole and the structural pin.

The method may comprise curing the flowable matrix material that has entered the hole while the structural pin is in the hole.

The method may comprise detecting some of the flowable matrix material having entered the hole and ceasing to infuse the flowable matrix material into the space associated with the delamination in the composite laminate after having detected some of the flowable matrix material having entered the hole.

The method may comprise infusing the flowable matrix material into the space via the first inboard location.

The method may comprise lowering a pressure at the edge location relative to a pressure at the first inboard location to draw the flowable matrix material from the first inboard location toward the edge location.

The method may comprise infusing the flowable matrix material via a hole extending at least partially through the composite laminate from a face of the composite laminate.

The method may comprise infusing the flowable matrix material into the space associated with the delamination in the composite laminate using a pressure differential between the edge location and a second inboard location in the composite laminate where the second inboard location is in fluid communication with the edge location via the space in the composite laminate associated with the delamination.

The method may comprise infusing the flowable matrix material into the space via the second inboard location.

The method may comprise ceasing to infuse the flowable matrix material into the space associated with the delamination in the composite laminate using the first inboard location before infusing the flowable matrix material into the space associated with the delamination in the composite laminate using the second inboard location.

The method may comprise substantially hermetically sealing the first inboard location before infusing the flowable matrix material into the space associated with the delamination in the composite laminate using the second inboard location.

The first inboard location may be at a first distance from the edge location and the second inboard location may be at a second distance from the edge location. The second distance may be greater than the first distance.

In another aspect, the disclosure describes a composite laminate with edge delamination in preparation for repair by infusion of a flowable matrix material. The composite laminate comprises:

a space in the composite laminate associated with the edge delamination, the space being in fluid communication with an edge of the laminate composite; and a first formed hole at a first inboard location in the composite laminate, the first formed hole extending from a face of the composite laminate and at least partially through the composite laminate, the first formed hole being in fluid communication with the space in the composite laminate associated with the edge delamination.

The composite laminate may comprise a first structural pin extending into the first formed hole.

The first structural pin may have an outer diameter that is smaller than a diameter of the first formed hole to permit the passage of the flowable matrix material between the first structural pin and a wall of the first formed hole.

A ratio of the diameter of the structural pin over the diameter of the formed hole may be about ⅔.

The composite laminate may comprise a second formed hole at a second inboard location on the composite laminate. The second formed hole may extend from the face of the composite laminate and at least partially through the composite laminate. The second formed hole may be in fluid communication with the space in the composite laminate associated with the edge delamination.

The first formed hole may be at a first distance from the edge location and the second formed hole may be at a second distance from the edge location. The second distance may be greater than the first distance.

In a further aspect, the disclosure describes a method for infusing a flowable matrix material into a space in the composite laminate. The method comprises:

supplying the flowable matrix material at an inlet location on the composite laminate, the inlet location being in fluid communication with the space in the composite laminate;

infusing the flowable matrix material into the space in the composite laminate using a pressure differential between the inlet location and a first location in the composite laminate, the first location being in fluid communication with the inlet location via the space in the composite laminate;

ceasing to infuse the flowable matrix material into the space using the first location;

infusing the flowable matrix material into the space in the composite laminate using a pressure differential between the inlet location and a second location in the composite laminate, the second location being in fluid communication with the inlet location via the space in the composite laminate; and ceasing to infuse the flowable matrix material into the space using the second location.

The first location may be at a first distance from the inlet location and the second location may be at a second distance from the inlet location. The second distance may be greater than the first distance.

The method may comprise lowering a pressure at the first location relative to a pressure at the inlet location via a first formed hole extending at least partially through the composite laminate from a face of the composite laminate.

The method may comprise ceasing to infuse the flowable matrix material into the space associated with the delamination in the composite laminate using the first formed hole after some of the flowable matrix material has entered the first formed hole.

The method may comprise hermetically sealing the first formed hole before infusing the flowable matrix material into the space in the composite laminate using the second location.

The method may comprise curing the flowable matrix material that has entered the first formed hole while a first structural pin is in the first formed hole.

The method may comprise lowering a pressure at the second location relative to the pressure at the inlet location via a second formed hole extending at least partially through the composite laminate from the face of the composite laminate.

The method may comprise ceasing to infuse the flowable matrix material into the space associated with the delamination in the composite laminate using the second formed hole after some of the flowable matrix material has entered the second formed hole.

Further details of these and other aspects of the subject matter of this application will be apparent from the detailed description and drawings included below.

BRIEF DESCRIPTION OF THE DRAWING FIGURES

Reference is now made to the accompanying drawings, in which:

FIG. 4 is a flowchart illustrating an exemplary method for infusing flowable matrix material into the porous region of the composite laminate of FIG. 1;

FIG. 9 is a flowchart illustrating an exemplary method for repairing composite laminate by infusion of flowable matrix material into a space in the composite laminate of FIG. 1;

FIG. 10 is a perspective view of an edge of an exemplary composite laminate comprising delamination damage;

FIG. 15 is a flowchart illustrating an exemplary method for repairing delamination damage in the composite laminate of FIG. 10 by infusion of flowable matrix material via an edge of the composite laminate;

FIG. 16 is a flowchart illustrating an exemplary method for repairing edge delamination damage in the composite laminate of FIG. 10 by infusion of flowable matrix material; and FIG. 17 is a flowchart illustrating an exemplary method for infusing flowable matrix material into a space in a composite laminate in a stepwise manner.

DETAILED DESCRIPTION OF THE EMBODIMENTS

The present disclosure relates to repairing defects in composite laminates that are introduced either during manufacturing or afterward. In various embodiments, methods and apparatus disclosed herein may, for example, be suitable for repairing defects in a composite laminate such as, for example, dry fibers, surface porosity and/or internal porosity that may have been introduced during manufacturing (e.g., during resin transfer infusion), or, delamination(s) at an edge of the composite laminate that may have been caused by an impact to the edge of the composite laminate during handling or during use. In various embodiments, the methods and apparatus disclosed herein may provide more complete filling of such defects with flowable matrix material (e.g., resin) and may therefore provide repaired composite laminates with improved structural performance.

The apparatus and methods disclosed herein may be used for repairing parts (e.g., laminates) of composite materials comprising fibre-reinforced structures (e.g., containing carbon, quartz glass, e-glass and/or other fibres) by resin infusion. For example, apparatus and methods disclosed herein may be used to repair parts manufactured by resin infusion processes such as resin transfer infusion (RTI), resin transfer molding (RTM), vacuum-assisted resin transfer molding (VARTM), vacuum-assisted resin infusion (VARI) and Seemann composites resin infusion molding process (SCRIMP) for example. Such parts may include parts for use in aerospace or other applications, such as for wind turbines, radomes or automotive parts. For example, within aerospace applications, such parts may include aircraft parts such as fuselage and wing components such as spars, skins and also nacelle components for aircraft engines. In some embodiments, the apparatus and methods disclosed herein may be used to repair regions of composite parts that have not been completely impregnated with resin during manufacturing or that have been damaged.

Apparatus and methods disclosed herein may be used to repair parts manufactured by processes other than resin infusion. For example, apparatus and methods disclosed herein may be used to repair parts manufactured using fibrous material that has been pre-impregnated with a resin system also known as "prepregs".

Aspects of various embodiments are described through reference to the drawings.

Figure 1:
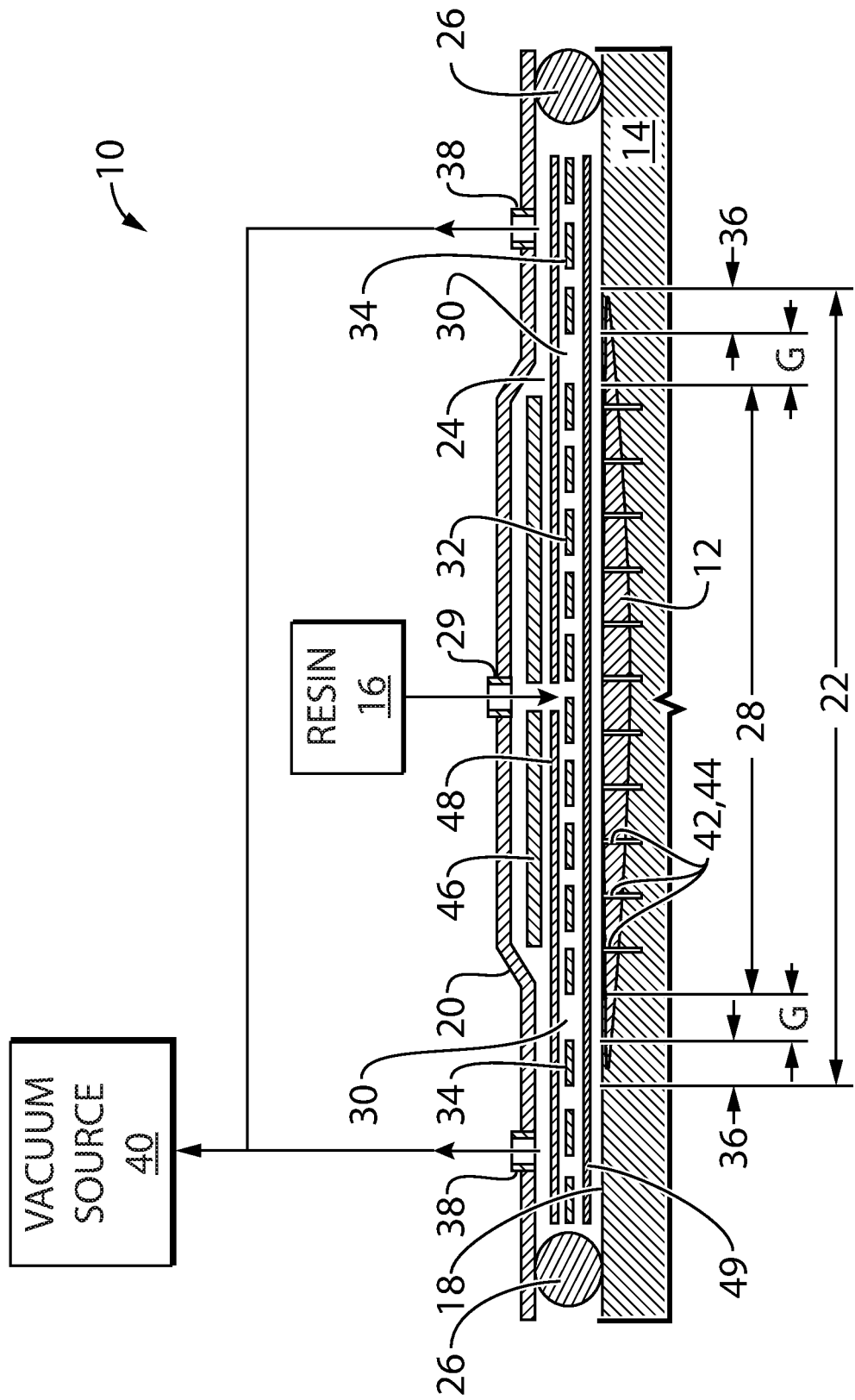
FIG. 1 is a schematic cross-sectional illustration of an exemplary apparatus for repairing a porous region in a composite laminate by infusion of flowable matrix material.

FIG. 1 is a schematic cross-sectional illustration of an exemplary apparatus 10 for repairing porous region 12 in composite laminate 14 by infusion of flowable matrix material (e.g., resin) 16 via face 18 of composite laminate 14. For the purpose of the present disclosure, a "face" of composite laminate 14 is intended to represent a (e.g., front or rear, prominent) surface of composite laminate 14 extending generally along (e.g., parallel to) one or more plies 52 (see FIGS. 2 and 5A) of composite laminate 14. Composite laminate 14 may have a flat panel configuration with a uniform thickness as shown in FIG. 1. Alternatively, it is understood that composite laminate 14 could be curved and/or have a varying thickness provided by ply starts and drop-offs for example.

Apparatus 10 may be used to repair defects such as porosity (e.g., voids, space, cracks) formed into composite laminate 14 during manufacturing or at some other time. Resin infusion processes such as resin transfer infusion (RTI), resin transfer molding (RTM), vacuum-assisted resin transfer molding (VARTM), vacuum-assisted resin infusion (VARI) and Seemann composites resin infusion molding process (SCRIMP) are known processes used for manufacturing composite laminates comprising fibre-reinforced structures. Occasionally, and depending on factors associated with such infusion processes, there can be dry fabric patches at the surface of fibre-reinforced parts that were not completely impregnated with resin during the process. Such a dry fabric patch can comprise porosity such as porous region 12 extending up to about 40% through the thickness of a composite structure such as composite laminate 14 for example. In some situations, depending on specific process parameters, a part produced by the RTI process can exhibit porosity extending up to 40% into the thickness of the part without a flow (e.g., vacuum) path extending from face 18 to some of the voids in porous region 12. Alternatively, porous region 12 may be associated with a manufacturing process other than resin infusion used to produce composite laminate 14 from, for example, prepreg material(s).

Apparatus 10 may comprise one or more vacuum barriers 20 (i.e., vacuum bags) (referred hereinafter in the singular) covering area 22 of the face 18 of composite laminate 14 defining a location of porous region 12 in composite laminate 14. The extent of porous region 12 defined by area 22 may be determined by way of non-destructive (i.e., ultrasound) inspection. Vacuum barrier 20 may define an enclosed volume 24 comprising at least part of area 22 defined on face 18 of composite laminate 14. In various embodiments, volume 24 may include only first portion 28 of area 22, or, volume 24 may include both first portion 28 and second 30 portion 36 of area 22. Vacuum barrier 20 may comprise a suitable polymer (e.g., nylon) flexible sheet and may be of the type(s) typically used as flexible bagging membranes (i.e., vacuum bags) in known or other resin infusion processes. Vacuum barrier 20 may be substantially gas-impermeable. Vacuum barrier 20 may be sealed to face 18 of composite laminate 14 via one or more sealing members 26. In some embodiments, sealing member(s) 26 may comprise a suitable sealant or double-sided tape. Sealing between vacuum barrier 20 and composite laminate 14 may not be absolutely hermetic but may be suitable for achieving at least some differential pressure between volume 24 and the atmosphere.

Apparatus 10 may comprise a supply of flowable matrix material 16 available to first portion 28 of area 22 defined on face 18 of composite laminate 14. Flowable matrix material 16 may be supplied to first portion 28 of area 22 via inlet port 29. Flowable matrix material 16 may have a viscosity that is temperature dependent. Accordingly, in some embodiments, apparatus may also comprise suitable heating means such as an electrically-powered heating blanket for applying heat to flowable matrix material 16 and optionally to part of composite laminate 14 to be infused with flowable matrix material 16.

In various embodiments, flowable matrix material 16 may comprise any resin suitable for the particular application. For example, flowable matrix material 16 may include an epoxy-based resin. Such epoxy-based resin may be a one-part liquid epoxy resin or a two-part liquid epoxy resin. In some embodiments, flowable matrix material 16 may be of the type sold under the trade name CYCOM 890 by CYTEC ENGINEERED MATERIALS. In some embodiments, flowable matrix material 16 may be of the type sold under the trade name HEXFLOW RTM 6 by HEXCEL. In some embodiments, flowable matrix material 16 may be a two-part liquid resin system such as product number EA9396 sold under the trade name HYSOL or of the type sold under the trade name CYCOM 823 by CYTEC ENGINEERED MATERIALS. Other types of cosmetic or structural resins may also be suitable for use as flowable matrix material 16 with the apparatus and methods disclosed herein.

Apparatus 10 may comprise one or more flow barriers 30 (referred hereinafter in the singular) hindering the flow of flowable matrix material 16 out of first portion 28 of area 22 via face 18 of composite laminate 14. Flow barrier 30 may comprise any suitable component serving to hinder flowable matrix material 16 from flowing across face 18 of composite laminate 14 beyond first portion 28 of surface area 22. Accordingly, flow barrier 30 may serve as a dam to the flow front of flowable matrix material 16. Flow barrier 30 may be a single element (e.g., a sealing member such as sealing member 26) or may include two or more elements cooperating together to achieve some hindrance to the flow of flowable matrix material 16 across face 18. For example, in some embodiments, a dry carbon cloth may serve as barrier 30 to slow/hinder the flow front of flowable matrix material 16 out of first portion 28 of area 22. Alternatively, in some embodiments, flow barrier 30 may be achieved by way of a double bagging arrangement where a first bag (e.g., vacuum barrier 20) would be installed to cover first portion 28 of area 22 of face 18 and a separate second bag (e.g., vacuum barrier 20) would be installed to cover second portion 36 of area 22 of face 18 so as to prevent the flow of flowable matrix material 16 across face 18 and out of first portion 28 of area 22.

Figure 2:
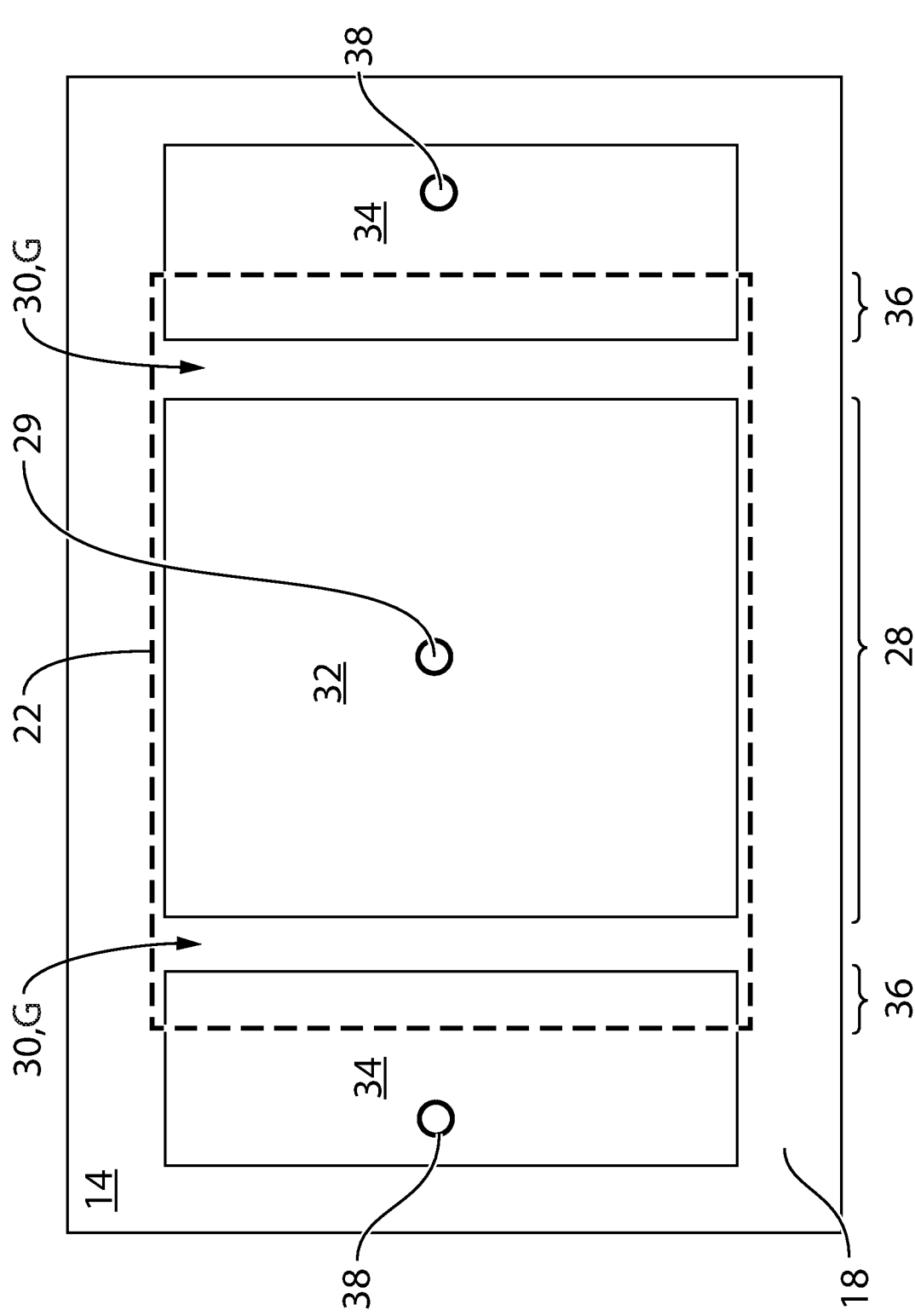
FIG. 2 is a schematic top plan view of a distribution carrier and overflow carriers of the apparatus of FIG. 1 disposed over the composite laminate.
Figure 3:
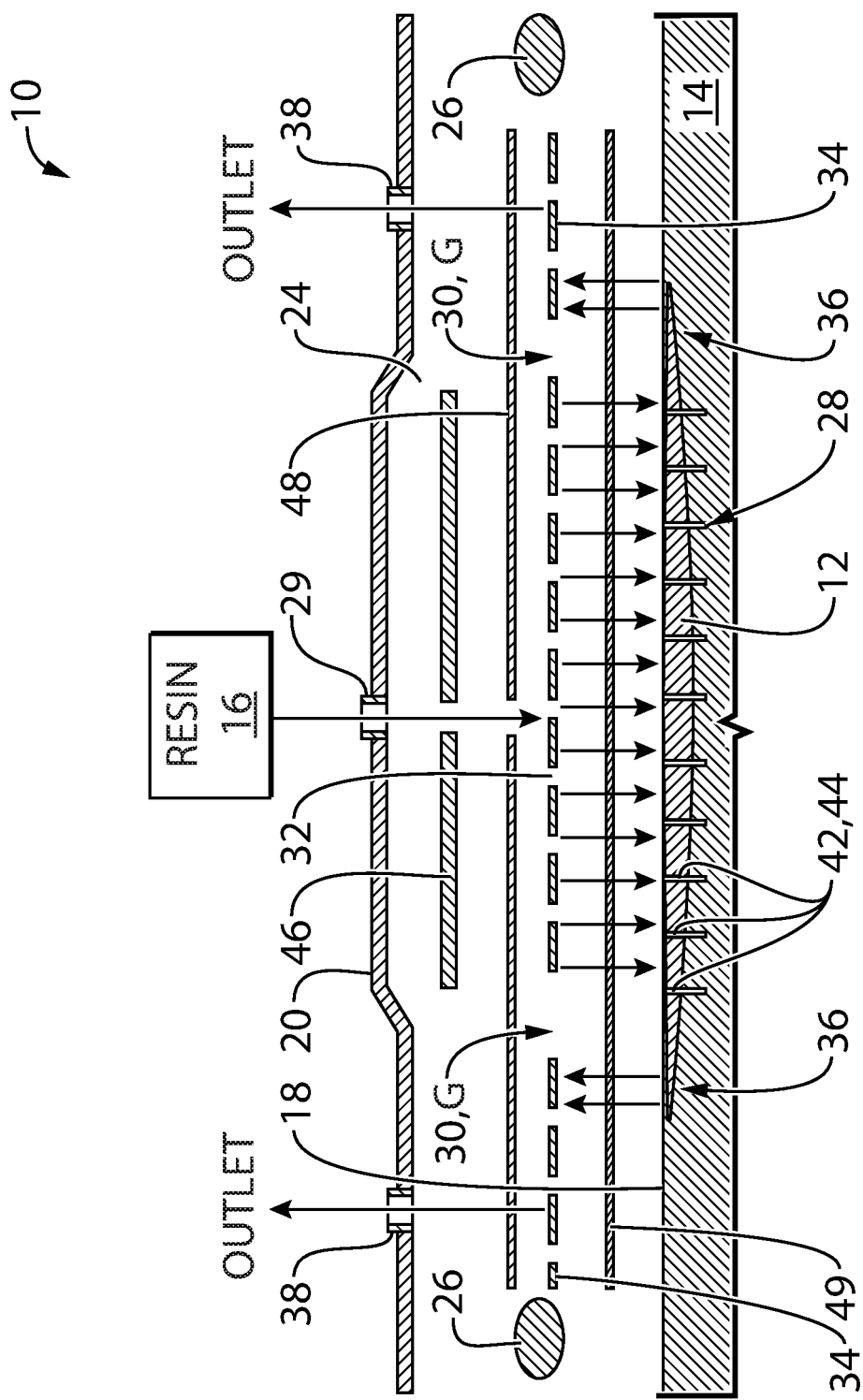
FIG. 3 is an exploded schematic cross-sectional illustration of the apparatus of FIG. 1 showing the flow path of flowable matrix material.

In some embodiments, flow barrier 30 may be defined by a gap G or break in a carrier layer of apparatus 10 configured to facilitating the flow/distribution of flowable matrix material 16 across face 18 as illustrated in FIGS. 1-3. For example, apparatus 10 may comprise distributing carrier 32 extending within at least part of first portion 28 of area 22 to facilitate the distribution (i.e., spread) of flowable matrix material 16 across face 18 but only within first portion 28 of area 22. In some embodiments, distributing carrier 32 may comprise a suitable distribution mesh of known or other types. For example, distributing carrier 32 may be configured as a net and may be made of nylon. Distributing carrier 32 may comprise open area through which flowable matrix material 16 may flow during the repair procedure. In some embodiments, distributing carrier 32 may comprise a glass or carbon cloth configured to facilitate the flow of flowable matrix material 16 across face 18. Apparatus 10 may also comprise one or more overflow carriers 34 (referred hereinafter in the singular) configured to facilitate the flow of flowable matrix material 16 exiting porous region 12 via one or more second portions 36 (referred hereinafter in the singular) of area 22 toward one or more respective vacuum ports 38 during the repair procedure. In some embodiments, overflow carrier 34 may be of the same construction/type as distribution carrier 32. Second portion 36 of area 22 may be disposed outside of first portion 28 of area 22. In the exemplary embodiment illustrated in FIG. 1, flow barrier 30 may be defined by gap G between distributing carrier 32 and overflow carrier 34 across which the flow of flowable matrix material 16 may be hindered during the repair procedure. Accordingly, first portion 28 of area 22 may be separated from second portion 36 by gap G.

Alternatively or in addition, flow barrier 30 may comprise one or more sealing members of the same type as sealing member 26 or of some other type. For example, such sealing member may be disposed between distributing carrier 32 and overflow carrier 34 (i.e., in gap G) so as to hinder the flow of flowable matrix material 16 out of first portion 28 of area 22 by flowing across face 18.

Vacuum port 38 may be coupled to vacuum source 40 (e.g., vacuum pump) that may be used to evacuate gas/air from volume 24 prior, during and/or 5 after the infusion of flowable matrix material 16 into porous region 12. Accordingly, vacuum source 40 may drive the flow of flowable matrix material 16 into porous region 12 primarily by drawing, by the application of a vacuum, flowable matrix material 16 from (e.g., central) one or more inlet ports 29 toward one or more vacuum ports 38 via porous region 12. For example, the application of such vacuum may cause flowable matrix material 16 to be drawn into porous region 12 via first portion 28 of area 22 and to exit porous region 12 via second portion 36 of area 22 by virtue of flow barrier 30 hindering the flow of flowable matrix material across face 18 and thereby forcing flowable matrix material 16 into porous region 12. A plurality of inlet ports 29 and/or a plurality of vacuum ports 38 may be used in some situations depending on the size and/or configuration of porous region 12 for example.

The evacuation of volume 24 via vacuum port 38 may also cause the difference in pressure between the atmosphere and volume 24 to press vacuum barrier 20 downwardly toward face 18 of composite laminate 14 and thereby urge flowable matrix material 16 disposed inside of volume 24 and above first portion 28 of area 22 against face 18 of composite laminate 14 and thereby promote infusion of flowable matrix material 16 into porous region 12.

As explained further below, composite laminate 14 may comprise one or more optional drilled (or otherwise formed) holes 42 (referred hereinafter in the singular) extending from face 18 inside first portion 28 of area 22 defined in face 18 and at least partially through composite laminate 14 to facilitate the infusion of flowable matrix material 16 into porous region 12. In some embodiments, an optional structural pin 44 may be disposed to extend into one, some or all formed holes 42. A passageway 54 (see FIG. 6A) for allowing the passage of flowable matrix material 16 therethrough may be defined between structural pin 44 and a wall of formed hole 42. Structural pin 44 may be disposed in formed hole 42 for the infusion of flowable matrix material 16 and also left in formed hole 42 during curing of flowable material 16 so as to remain in the repaired composite laminate 14 and provide structural reinforcement. Curing of flowable matrix material 16 may be conducted according to known or other methods based on the type of flowable matrix material 16 used.

Apparatus 10 may comprise flexible caul plate 46 and release film 48 disposed inside volume 24. Flexible caul plate 46 may be disposed between vacuum barrier 20 and release film 48. Release film 48 may be disposed between flexible caul plate 46 and distributing carrier 32. In some embodiments, porous release medium 49 may be disposed between distributing carrier 32 and outer face 18 of part 14. In various embodiments, release film 48 may comprise a cohesively formed plastic that does not readily adhere to other polymers. Release film 48 may, for example, comprise a fluorpolymeric film of the type sold under the trade name WRIGHTLON 5200 or under product number A4000 by Airtech International Inc. In some embodiments, porous release medium 49 may comprise a polytetrafluorethylene (PTFE) coated fibreglass fabric of the type sold under the trade name RELEASE EASE supplied by Airtech International Inc. Porous release medium 49 may comprise a plurality of openings through which flowable matrix material 16 may permeate during the infusion process. In some embodiments, porous release medium 49 may, for example, be of the type sold under product number A4000P by Airtech International Inc. Caul plate 46 may comprise an elastomeric material providing some flexibility. In some embodiments, caul plate 46 may be made of a rubber or a rubber/silicone combination for example. The use of caul plate 46 may protect vacuum barrier 20 from getting punctured by structural pin 44 that may protrude out of hole 42 so as to be raised from face 18 of composite laminate 14.

FIG. 2 is a schematic top plan view of composite laminate 14 showing area 22 defining the location of porous region 12. FIG. 2 also shows distribution carrier 32 and overflow carrier 34 of apparatus 10 overlaying area 22 as shown in FIG. 1. As explained above, distribution carrier 32 may overlay first portion 28 of area 22 and may facilitate the distribution of flowable matrix material 16 from inlet port 29 across face 18 of composite laminate within first portion 28 of area 22 only. Overflow carrier 34 may overlay second portion 36 of area 22 and extend toward vacuum port 38 so as to facilitate the flow of flowable matrix material 16 exiting second portion 36 of area 22 during infusion toward vacuum port 38. During the evacuation of volume 24 via vacuum port 38, the gap G between distribution carrier 32 and overflow carrier 34 may permit release film 48 and vacuum barrier 20 to be pressed downwardly toward face 18 of composite laminate 14 at the location of gap G to form flow barrier 30 (e.g., dam) that hinders the flow of flowable matrix material 16 across gap G via face 18 of composite laminate 14. For example, release film 48 (see FIG. 1) may extend across gap G and pressed downwardly toward face 18 during evacuation of volume 24 so as to hinder the flow of flowable matrix material 16 on face 18 across gap G.

FIG. 3 is an exploded schematic cross-sectional illustration of apparatus 10 showing the flow path of flowable matrix material 16 during infusion. During the evacuation of volume 24, flowable matrix material 16 may be urged downwardly against first region 28 of area 22 of face 18 to cause infusion of flowable matrix material 16 into porous region 12 while the flow of flowable matrix material 16 out of the first portion 28 of area 22 via face 18 of composite laminate 14 is hindered by flow barrier 30 (e.g., see downward arrows in first portion 28 of area 22). As porous region 12 becomes at least partially filled with flowable matrix material 16, excess flowable matrix material 16 in porous region 12 may be permitted to exit (e.g., overflow) porous region 12 via second portion 36 of area 22 where first portion 28 of area 22 may be in fluid communication with second portion 36 of area 22 via spaces/voids inside porous region 12. In some embodiments, first portion 28 of area 22 and associated inlet port 29 may be disposed in an inner (e.g., central, radially inner) portion of area 22 so that flowable matrix material 16 may enter a generally central portion of porous region 12 and exit a generally outer (i.e., peripheral) region of porous region 12. In some situations where a central portion of porous region 12 extends more deeply into composite laminate 14, such flow path for flowable matrix material 16 may facilitate a more complete (e.g., deeper) infusion of porous region 12.

FIG. 4 is a flowchart illustrating an exemplary method 400 for infusing flowable matrix material 16 into porous region 12 in composite laminate 14 via face 18 (or other surface) of composite laminate 14. In some embodiments, method 400 may be performed using apparatus 10 described above where face 18 of composite laminate 14 comprises area 22 overlaying a location of porous region 12 in composite laminate 14. Method 400 may comprise: supplying flowable matrix material 16 to first portion 28 of area 22 of face 18 of composite laminate 14 (see block 402); distributing flowable matrix material 16 across at least some of first portion 28 of area 22 (see block 404); and while hindering the flow of flowable matrix material 16 out of first portion 28 of area 22 via face 18 of composite laminate 14, drawing flowable matrix material 16 in first portion 28 of area 22 into porous region 12 and causing some flowable matrix material 16 to exit porous region 12 via second portion 36 of area 22 where second portion 32 of area 22 is outside first portion 28 of area 22 (see block 406).

In some embodiments, method 400 may comprise using vacuum source 40 to draw flowable matrix material into porous region 12 as explained above. The flow of flowable matrix material 16 exiting porous region 12 via second portion 36 of area 22 away from second portion 36 (e.g., toward vacuum port 38) may be facilitated by overflow carrier 34.

Figure 5B:
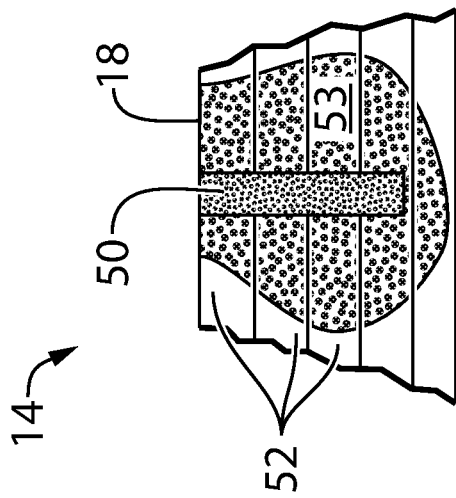
FIG. 5B is a partial schematic cross-sectional view of the composite laminate of FIG. 1 at a column of cured flowable matrix material extending from a face of the composite laminate after infusion.
Figure 5A:
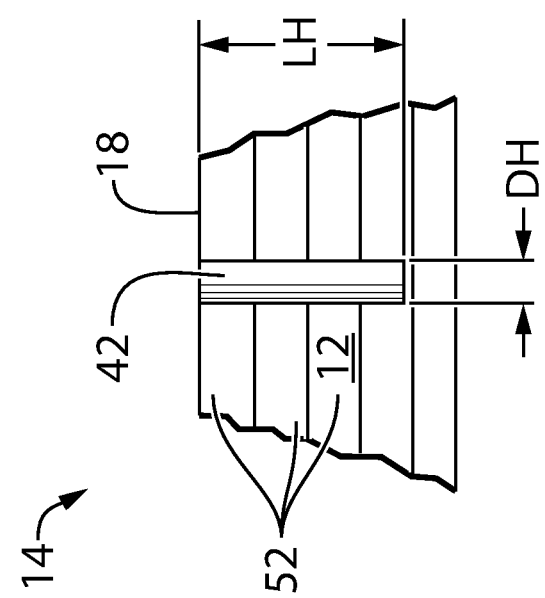
FIG. 5A is a partial schematic cross-sectional view of the composite laminate of FIG. 1 at a formed hole extending from a face of the composite laminate before infusion.

FIG. 5A is a partial schematic cross-sectional view of composite laminate 14 at formed hole 42 extending from face 18 at least partially through composite laminate 14 before infusion of flowable matrix material 16 into porous region 12. FIG. 5B is a partial schematic cross-sectional view of composite laminate 14 at a corresponding column 50 of cured flowable matrix material 16 extending from face 18 at least partially through composite laminate 14 after infusion of flowable matrix material 16 into porous region 12 and subsequent curing.

Formed hole 42 may be used in conjunction with the apparatus and methods disclosed herein. Hole 42 may be formed by mechanical drilling, laser drilling or be otherwise formed into composite laminate 14 to facilitate the infusion of flowable matrix material 16 into porous region 12 or other defect within composite laminate 14. Accordingly, formed hole 42 may be formed prior to infusion of flowable matrix material 16 into porous region 12. In some embodiments, the depth LH of hole 42 may be selected based on the depth of porous region 12 from face 18 of composite laminate 14 so as to facilitate the infusion of flowable matrix material 16 to a desired depth into porous region 12. In some embodiments, depth LH of hole 42 may be selected to extend through two or more plies 52 of composite laminate 14. In some embodiments, depth LH of hole 42 may be selected to extend completely through the thickness of composite laminate 14.

Alternatively or in addition, hole 42 may be used to provide structural reinforcement through the thickness (e.g., transverse, in the Z direction) of composite laminate 14 after repair by allowing the formation of column 50 of cured flowable matrix material 16 extending between plies 52 of composite laminate 14. The width or diameter DH of hole 42 may be selected based on the expected viscosity of flowable matrix material 16 so that flowable matrix material 16 may flow adequately into hole 42. The width or diameter DH of hole 42 may be selected based on a desired corresponding width or diameter of column 50 of cured flowable matrix material 16. Accordingly, in various embodiments, the apparatus and methods disclosed herein may be used to produce a composite laminate repaired by infusion of flowable matrix material 16 and comprising volume 53 of cured matrix material 16 infused into porous region 12 of composite laminate 14 during repair and column 50 of cured flowable matrix material 16 extending from face 18 of composite laminate 14 and at least partially through composite laminate 14.

Figure 6B:
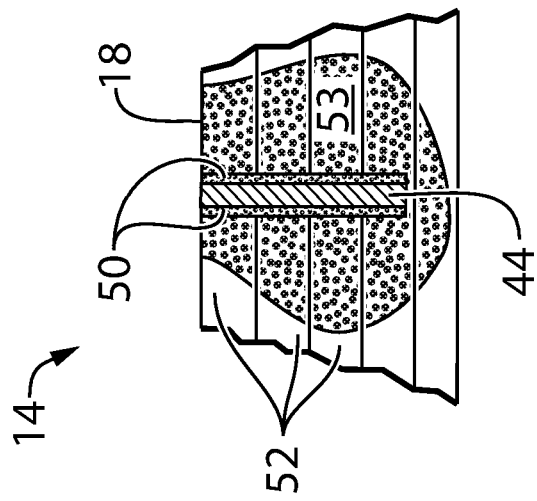
FIG. 6B is a partial schematic cross-sectional view of the composite laminate of FIG. 1 at a column of cured flowable matrix material extending from the face of the composite laminate after infusion where the structural pin is disposed in the column.
Figure 6A:
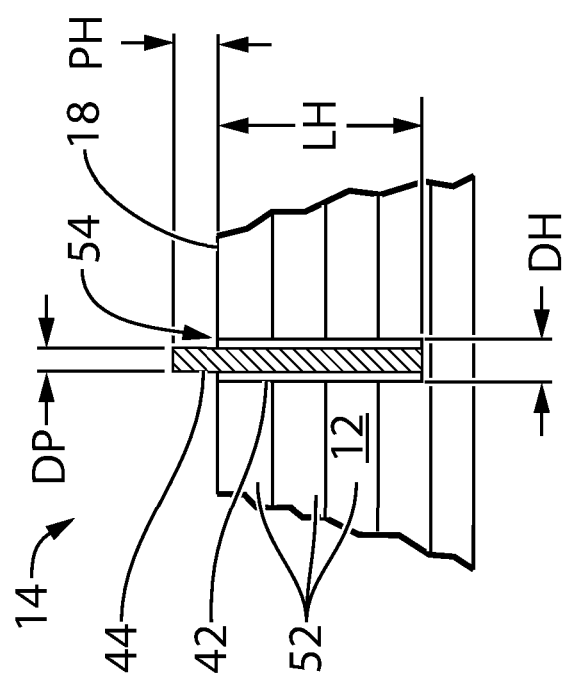
FIG. 6A is a partial schematic cross-sectional view of the composite laminate of FIG. 1 at a formed hole extending from the face of the composite where a structural pin has been inserted into the formed hole before infusion.

FIG. 6A is a partial schematic cross-sectional view of composite laminate 14 at formed hole 42 extending from face 18 at least partially through composite laminate 14 where structural pin 44 has been inserted into formed hole 42 before infusion of flowable matrix material 16 into porous region 12. FIG. 6B is a partial schematic cross-sectional view of composite laminate 14 at a corresponding column 50 of cured flowable matrix material 16 extending from face 18 at least partially through composite laminate 14 after infusion of flowable matrix material 16 into porous region 12 and subsequent curing where structural pin 44 is disposed inside column 50.

Formed hole 42 may have the same characteristics as described above. In various embodiments, structural pin 44 may be made of metal (e.g., steel, copper, titanium), glass, graphite or carbon fibres. In some embodiments, structural pin 44 may comprise fibrous material (e.g., carbon fibres). Structural pin 44 may be inserted into hole 42 before infusion of flowable matrix material 16 into hole 42 and into space(s) in porous region 12. Structural pin 44 may have a pin diameter DP that is smaller than the hole diameter DH in order to form passageway 54 along hole 42 between structural pin 44 and a wall of hole 42. Such passageway 54 may be configured to permit the flow of flowable matrix material 16 into hole 42 so as to facilitate the infusion of flowable matrix material 16 into porous region 12 of composite laminate 14. In some embodiments, a ratio of the diameter DP of structural pin 44 over the diameter DH of hole 42 may be about ⅔. For example, in one embodiment, hole 42 may have a diameter of about 0.75 mm and structural pin 44 may have a diameter DP of about 0.5 mm.

The characteristics of structural pin 44 may be selected based on the structural and physical properties desired from the presence of structural pin 44 in the repaired composite laminate 14. For example, the material(s) of structural pin 44 may be selected in view of desired electromagnetic interference (EMI), electromagnetic compatibility (EMC), high intensity radiated fields (HIRF) performance, coefficient of thermal expansion and/or other factors. Structural pin 44 may also provide reinforcement through the thickness (e.g., transverse, in the Z direction) of composite laminate 14 after infusion by allowing the formation of column 50 of cured flowable matrix material 16 and structural pin 44 disposed therein extending between plies 52 of composite laminate 14 and may be referred as a "Z-pin". The cross-sectional area of passageway 54 may be selected based on the expected viscosity of flowable matrix material 16 so that flowable matrix material 16 may flow adequately into hole 42 and around structural pin 44. The sizes of hole 42 and structural pin 44 may be selected based on a desired corresponding size of column 50 of cured flowable matrix material 16 with structural pin 44 disposed therein. In some embodiments, structural pin 44 may be longer than the depth LH of hole 42 so that structural pin 44 protrudes from face 18 by the protruding height PH. The protruding height PH may provide an indication of the depth LH of hole 42 for the purpose of (e.g., visual) verification prior to infusion. The protruding height PH of structural pin 44 may be maintained for the infusion process. The use of flexible (e.g., rubber) caul plate 46 may substantially prevent vacuum barrier 20 from getting damaged or punctured due to the evacuation of volume 24 during infusion.

As shown in FIG. 6B, the protruding height PH of structural pin 44 may be removed by grinding or cutting for example after curing of flowable matrix material 16 so that, for example, the upper end of structural pin 44 may be substantially flush with face 18. In some embodiments, the presence of structural pin 44 inside of column 50 of cured flowable matrix material 16 may provide additional structural reinforcement in comparison with a column 50 of cured flowable matrix material 16 without structural pin 44 therein. Structural pin 44 may extend generally along column 50 of cured flowable matrix material 16.

Figure 7:
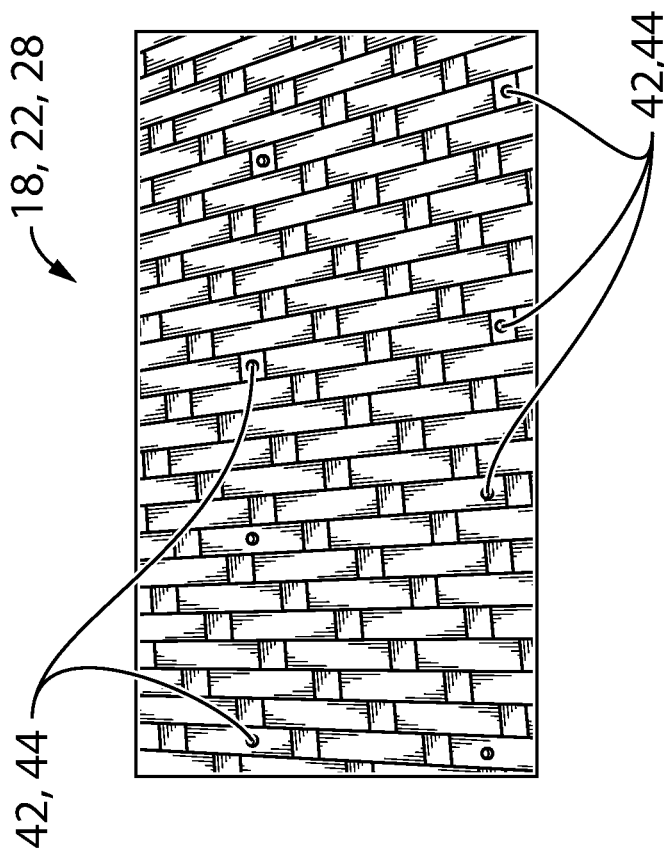
FIG. 7 is a perspective view of an exemplary face of the composite laminate comprising dry fibers where the face comprises holes and structural pins inserted in the holes.

FIG. 7 is a perspective view of an exemplary first portion 28 of face 18 of composite laminate 14 where porous region 12 comprises dry fibers. FIG. 7 shows an outer ply 52 of composite laminate 14 having a 5-harness configuration and through which a plurality of holes 42 has been formed and a structural pin 44 has been inserted into each hole 42. The plurality of holes 42 (and structural pins 44) may be arranged in an array with spacing selected based on a determined need for assisting/facilitating the infusion of flowable matrix material 16 into porous region 12 via holes 42 and may be based on the size and depth of porous region 12. Alternatively, the spacing and arrangement of holes 42 and structural pins 44 may be based on the structural reinforcement desired in repaired composite laminate 14 via column 50 and structural pin 44.

Figure 8:
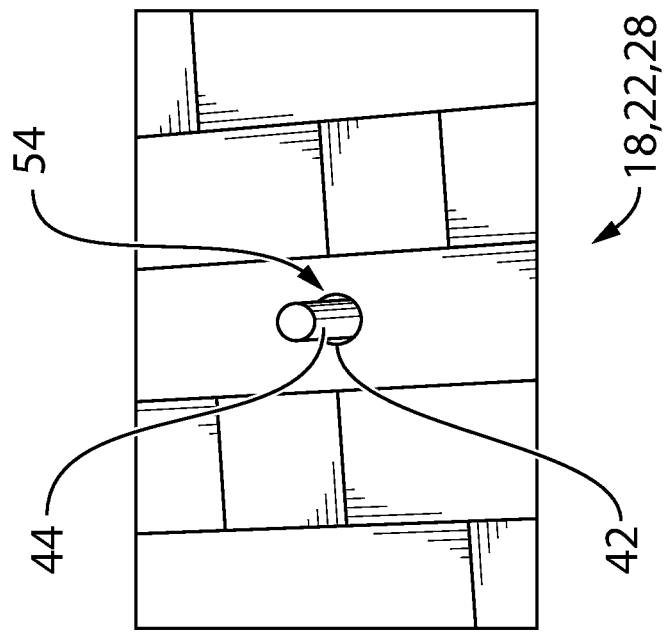
FIG. 8 is an enlarged perspective view of an exemplary hole formed in the face of composite laminate shown in FIG. 7 with a structural pin extending in the hole.

FIG. 8 is an enlarged perspective view of an exemplary hole 42 formed in face 18 of composite laminate 14 with structural pin 44 extending therein.

FIG. 9 is a flowchart illustrating an exemplary method 900 for repairing composite laminate 14 by infusion of flowable matrix material 16 into a space (e.g., defect, crack, delamination, porous region 12) in the composite laminate 14. In some embodiments, method 900 may be performed using apparatus 10 described above where face 18 of composite laminate 14 comprises area 22 overlaying a location of porous region 12 in composite laminate 14. Method 900 or part(s) thereof may be performed in conjunction with method 400 or other methods disclosed herein. Method 900 may comprise infusing flowable matrix material 16 into the space via passageway 54 defined between optional structural pin 44 disposed in hole 42 extending from face 18 (or from other surface of composite laminate 14) at least partially through composite laminate 14 (e.g., and into the space in composite laminate 14), and, a wall of hole 42 (see block 902).

In methods 400 and/or 900, the detection of flowable matrix material 16 overflowing space (e.g., porous region 12) via second portion 36 of area 22 may be used as an indication that the space into which flowable matrix material 16 is being infused is sufficiently filled. Accordingly, methods 400 and/or 900 may comprise detecting some flowable matrix material 16 exiting porous region 12 via second portion 36 of area 22 and ceasing the drawing/infusion of flowable matrix material 16 after having detected some of flowable matrix material 16 having exited porous region 12 via second portion 36. Such detection may be made by visual inspection of some operator of apparatus 10 or by some automated sensing/detecting equipment. In some embodiments, the detection of overflow of flowable matrix material 16 may be made by detecting the presence of flowable matrix material 16 exiting vacuum port 38 or by detecting the presence of flowable matrix material 16 in a suitable resin trap installed between vacuum port 38 and the vacuum source 40.

Methods 400 and/or 900 may comprise curing flowable matrix material 16 infused into the space (e.g., porous region 12 or other defect) and into passageway 54 while structural pin 44 is in formed hole 42 (see block 904).

In some embodiments, methods for infusing flowable matrix material 16 into a space inside composite laminate 14 may comprise infusing flowable matrix material 16 into the space via passageway 54 as explained above in relation to porous region 12. Alternatively, in some embodiments, methods disclosed herein may comprise infusing flowable matrix material 16 into passageway 54 via the space (e.g., defect) in composite laminate 14 (i.e., in the opposite direction) as explained below in relation to edge delamination. Accordingly, in some embodiments, method 900 may comprise detecting some of flowable matrix material 16 having entered passageway 54 and ceasing to infuse flowable matrix material 16 into the space after having detected some of flowable matrix material 16 having entered passageway 54.

FIG. 10 is a perspective view of an edge 56 of composite laminate 34 where edge 56 comprises delamination damage 58. Such edge delamination damage 58 may be caused, for example, by one or more impacts to edge 56 of composite laminate 34 during handling or during use of composite laminate 34. Delamination damage 58 may comprise empty space (e.g., void(s), crack(s)) formed inside composite laminate 34 due to edge delamination. The empty space may be disposed between adjacent plies 52 and may be in the form of a crack extending from edge 56 and to some depth inside composite laminate 34. Traditional methods for repairing such edge delamination damage 58 may not have the ability to get resin to sufficient depth or to the crack tip inside composite laminate 34. As a result voids may remain inside parts repaired by traditional repair methods and affect structural performance. In various embodiments, apparatus and methods disclosed herein may be used to repair such delamination defect by resin infusion in order to achieve more complete filing of the space formed inside composite laminate 14 due to edge delamination. In some embodiments, apparatus and methods disclosed herein may be used to also provide through-thickness structural reinforcement via column 50 and optionally structural pin 44 to increase the resistance to further (e.g., impact) damage.

As shown in FIG. 10 delamination damage 58 may include multilayer delamination which may, for example, occur in composite laminate 14. Alternatively, delamination damage 58 may include single-layer delamination. For the purpose of the present disclosure, an "edge" of composite laminate 14 is intended to represent a surface of composite laminate 14 extending generally transversely to individual plies 52 (see FIG. 5A) of composite laminate 14 and at which individual plies 52 terminate as shown by reference character 56 in FIG. 10. Edge 56 of composite laminate 14 may not necessarily be perpendicular to face 18 and may be at an oblique angle to face 18.

Figure 11:
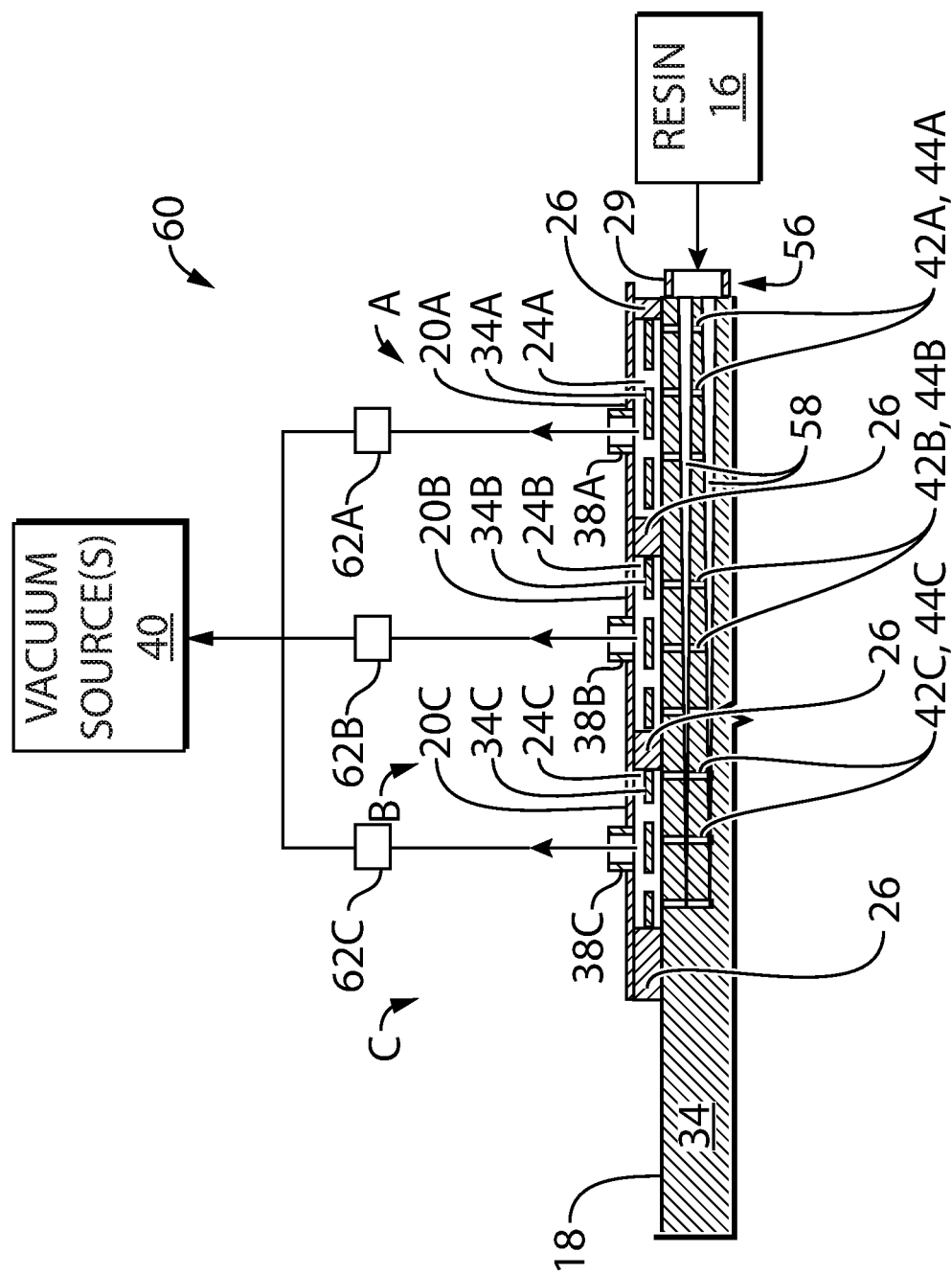
FIG. 11 is a schematic cross-sectional illustration of an exemplary apparatus for repairing delamination damage in the composite laminate of FIG. 10.

FIG. 11 is a schematic cross-sectional illustration of an exemplary apparatus 60 for repairing delamination damage 58 in composite laminate 14 by infusion of flowable matrix material (e.g., resin) 16 via edge 56 of composite laminate 14. Apparatus 60 may be used to at least partially fill space(s) (e.g., void(s), crack(s)) inside composite laminate 14 due to delamination damage 58 in a stepwise manner in order to obtain more complete filling of such space(s) relative to traditional repair methods.

Apparatus 60 may comprise vacuum barriers 20A-20C and sealing members 26 together defining a plurality of inboard zones A-C at different distances from edge 56 of composite laminate 34. For example, in the case where apparatus 60 defines three inboard zones, zone A may be disposed at a first distance from edge 56, zone B may be disposed at a second distance from edge 56 where the second distance is greater than the first distance, and, zone C may be disposed at a third distance from edge 56 where the third distance is greater than the second distance. The number and size of zones A-C may be selected based on the extent (e.g, depth, spread) of delamination damage 58 to be repaired. Similarly, the number of inlet ports 29 may be selected based on the extent (e.g, depth, spread) of delamination damage 58 to be repaired. The extent of delamination damage 58 may be determined by way of non-destructive (i.e., ultrasound) inspection and such information may be used to determine the number and positions of zones A-C accordingly. The use of zones A-C may permit the progressive infusion of flowable matrix material 16 into delamination damage 58 in a stepwise manner as described below.

Each inboard zone A-C may comprise the same elements configured in a similar manner so the following description is directed to zone A only. It is understood that some elements from apparatus 10 described above are also found in apparatus 60 and therefore their description is not repeated. Like elements are referenced using like reference numerals. With respect to zone A, vacuum barrier 20A, seals 26 and face 18 of composite laminate 14 may define enclosed volume 24A in fluid communication with the space in composite laminate 14 associated with delamination damage 58 via formed hole 42A in face 18 of composite laminate 14. A supply of flowable matrix material 16 may be coupled to the space in composite laminate 14 associated with delamination damage 58 via edge 56 of composite laminate 34. For example, the supply of flowable matrix material 16 may be in fluid communication with delamination damage 58 via inlet port 29. Apparatus 60 may comprise vacuum source 40 coupled to volume 24A for causing flowable matrix material 16 to flow from edge 56 of composite laminate 14 into formed hole 42A via the space associated with delamination damage 58.

Vacuum source 40 may be coupled to volume 24A via vacuum port 38A. Apparatus 60 may comprise a suitable 62A valve of known or other type actuatable from an open position to a closed position where the open position permits a vacuum to be drawn (fluid flow) through vacuum port 38A and the closed position substantially prevents fluid flow through vacuum port 38A. Even though the exemplary embodiment shown in FIG. 11 comprises a single vacuum source 40 coupled to a plurality of volumes 24A-24C, it is understood that different vacuum sources 40 could be coupled to different volumes 24A-24C. For example, in some embodiments, each volume 24A-24C could have its own dedicated vacuum source 40.

Apparatus 60 may comprise other elements omitted from FIG. 11 for the sake of clarity. For example, apparatus 60 may also comprise flexible caul plate 46, one or more release films 48, and one or more porous release media 49 described above in relation to apparatus 10. For example, a suitable release film 48 may be disposed between vacuum barrier 20 and overflow carrier 34 of each zone. Similarly, a suitable porous release medium 49 may be disposed between overflow carrier 34 and face 18 of composite laminate 14.

In various embodiments, volume 24A may be closer to edge 56 of composite laminate 34 than volume 24B. Similarly, volume 24B may be closer to edge 56 of composite laminate 34 than volume 24C. Accordingly, each zones A-C may be used sequentially, non-sequentially or concurrently during infusion to progressively infuse flowable matrix material 16 deeper into composite laminate 14 and to provide more complete filing of delamination damage 58.

Figure 12B:
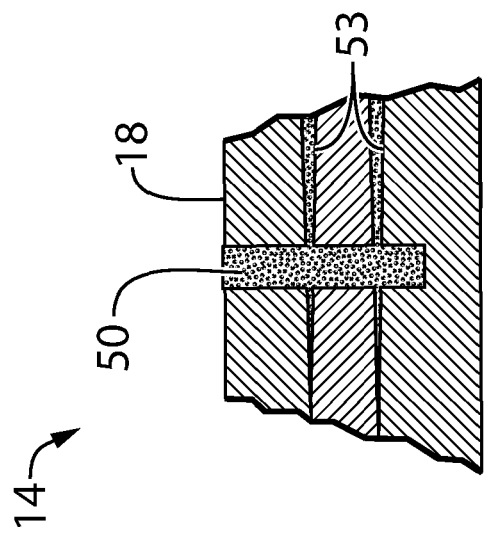
FIG. 12B is a partial schematic cross-sectional view of the composite laminate of FIG. 10 at a column of cured flowable matrix material extending from the face of the composite laminate after infusion.
Figure 12A:
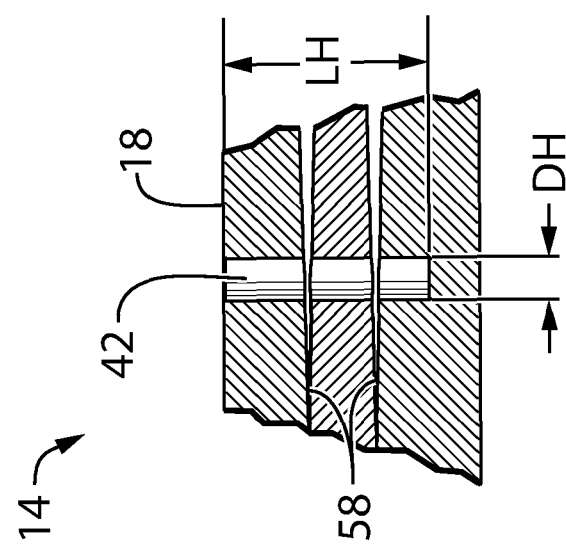
FIG. 12A is a partial schematic cross-sectional view of the composite laminate of FIG. 10 at a formed hole extending from a face of the composite laminate before infusion.

FIG. 12A is a partial schematic cross-sectional view of composite laminate 14 at formed hole 42 extending from face 18 at least partially through composite laminate 14 before infusion of flowable matrix material 16 into delamination damage 58. FIG. 12B is a partial schematic cross-sectional view of composite laminate 14 at a corresponding column 50 of cured flowable matrix material 16 extending from face 18 at least partially through composite laminate 14 and volume 53 of cured flowable matrix material 16 having been infused into delamination damage 58 and cured.

Formed hole 42 may be used in conjunction with the apparatus and methods disclosed herein to facilitate the infusion of flowable matrix material 16 into delamination damage 58 or other defect within composite laminate 14. The characteristics of formed hole 42 may be the same as to those previously described above unless otherwise indicated. The depth LH of hole 42 may be selected based on the depth of delamination damage 58. Depth LH may be selected to extend through two or more plies 52 of composite laminate 14. Formed hole 42 may be used to provide structural reinforcement across the thickness (e.g., transverse, in the Z direction) of composite laminate 14 after repair by allowing the formation of column 50 of cured flowable matrix material 16 extending at least partially through composite laminate 14.

Figures 13A, 13B:
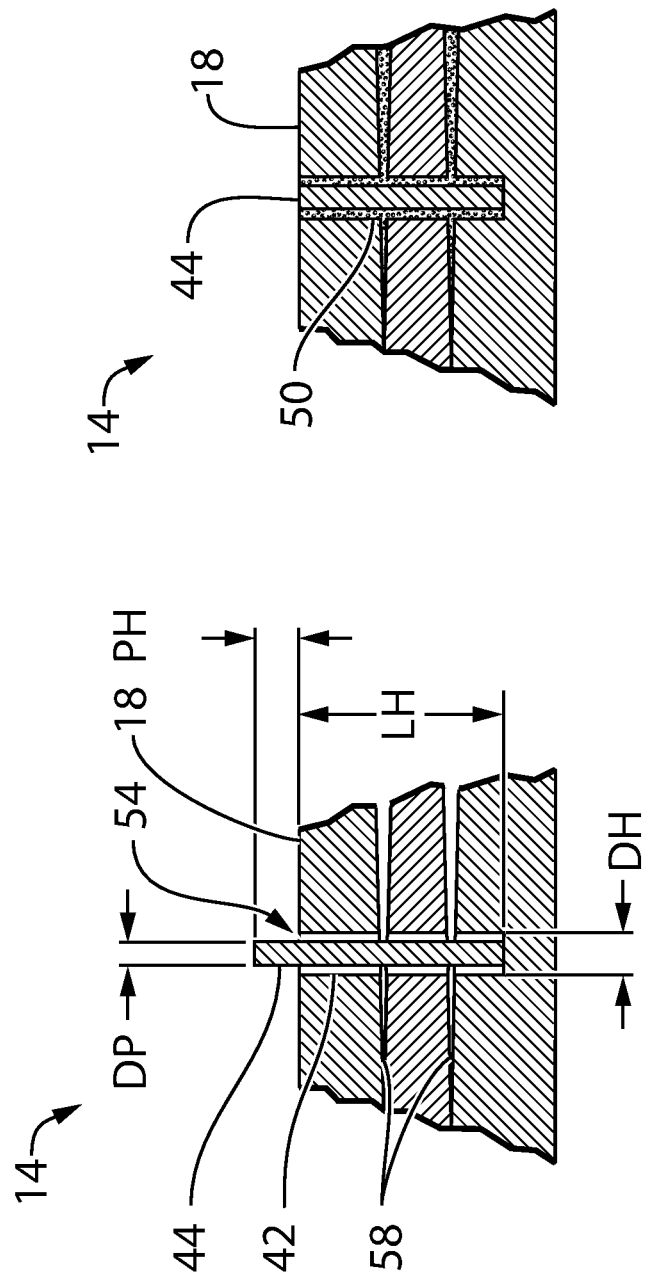
FIG. 13A is a partial schematic cross-sectional view of the composite laminate of FIG. 10 at the formed hole extending from the face of the composite laminate where a structural pin has been inserted into the formed hole before infusion.
FIG. 13B is a partial schematic cross-sectional view of the composite laminate of FIG. 10 at a column of cured flowable matrix material extending from the face of the composite laminate after infusion where the structural pin is disposed inside the column.

FIG. 13A is a partial schematic cross-sectional view of composite laminate 14 at formed hole 42 extending from face 18 at least partially through composite laminate 14 where structural pin 44 has been inserted into formed hole 42 before infusion of flowable matrix material 16 into delamination damage 58. FIG. 13B is a partial schematic cross-sectional view of composite laminate 14 at a corresponding column 50 of cured flowable matrix material 16 extending from face 18 at least partially through composite laminate 14 after infusion of flowable matrix material 16 into delamination damage 58 and subsequent curing where structural pin 44 is disposed inside column 50.

Formed hole 42 and structural pin 44 may have the same characteristics as described above unless otherwise indicated. Structural pin 44 may be inserted into formed hole 42 before infusion of flowable matrix material 16 into formed hole 42 and into delamination damage 58. Structural pin 44 may have a pin diameter DP that is smaller than the hole diameter DH in order to form passageway 54 along hole 42 between structural pin 44 and a wall of hole 42. Such passageway 54 may be configured to permit the flow of flowable matrix material 16 into hole 42 so as to facilitate the infusion of flowable matrix material 16 into delamination damage of composite laminate 14.

Structural pin 44 may provide reinforcement across the thickness (e.g., transverse, in the Z direction) of composite laminate 14 after repair by allowing the formation of column 50 of cured flowable matrix material 16 and structural pin 44 disposed therein extending between plies 52 of composite laminate 14.

As shown in FIG. 13B, the protruding height PH of structural pin 44 may be removed by grinding or cutting for example after curing of flowable matrix material 16 so that the upper end of structural pin 44 may, for example, be substantially flush with face 18.

Figure 14:
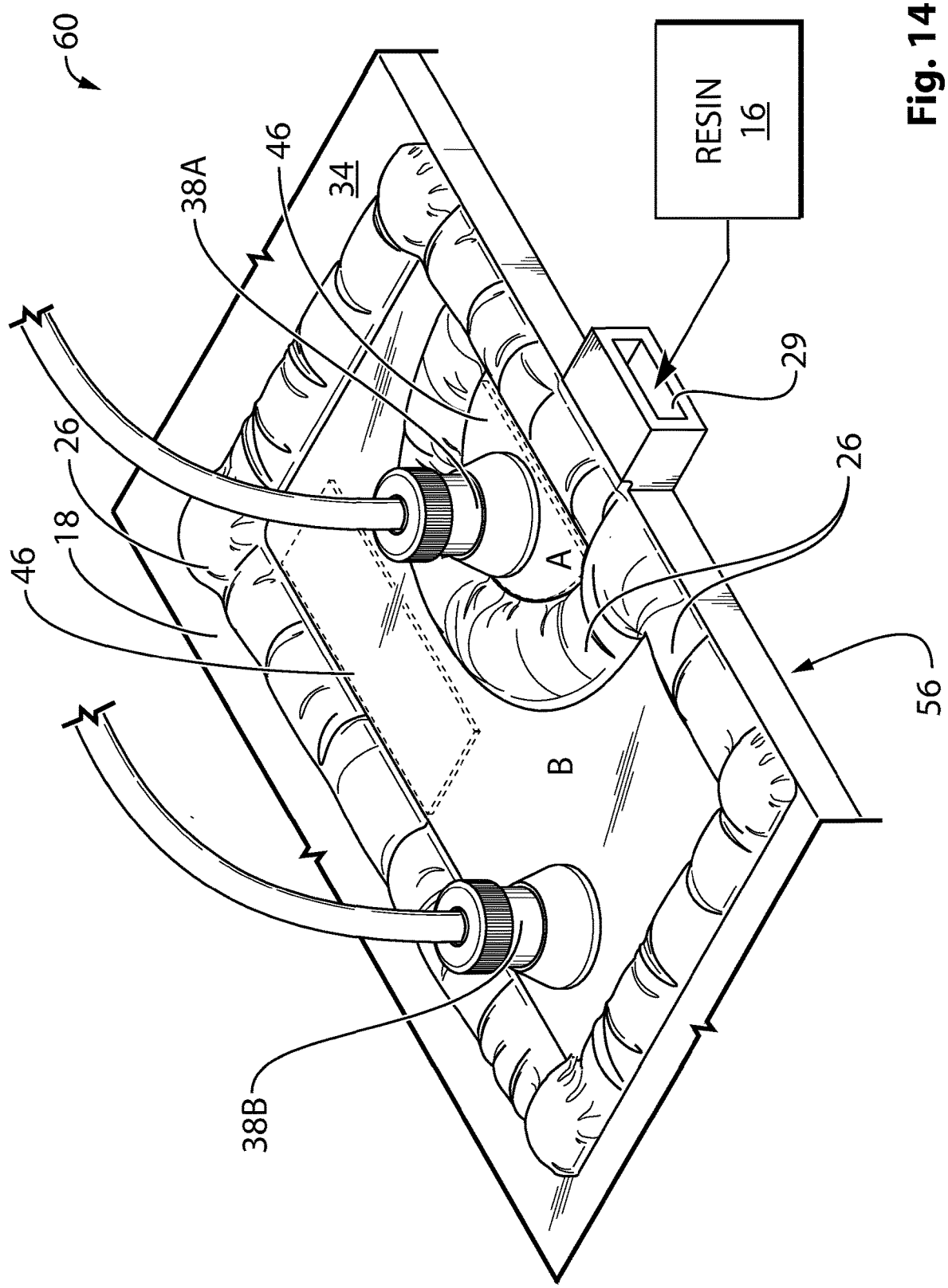
FIG. 14 is a perspective view of part of an exemplary embodiment of the apparatus of FIG. 11.

FIG. 14 is a perspective view of part of an apparatus 60 comprising only two zones A and B.

FIG. 15 is a flowchart illustrating an exemplary method 1500 for repairing edge delamination damage 58 in composite laminate 14 by infusion of flowable matrix material 16 via edge 56 of composite laminate 14. Method 1500 may be performed using apparatus 60. Aspects of method 1500 may be applicable to other methods disclosed herein. In various embodiments, method 1500 may comprise: supplying flowable matrix material 16 at a location of edge 56 of composite laminate 16 (see block 1502) where the edge location is in fluid communication with a space in composite laminate 14 associated with the delamination; infusing flowable matrix material 16 into the space associated with the delamination in composite laminate 14 using a pressure differential between the edge location and a first inboard location (e.g., formed hole 42A in FIG. 11) in composite laminate 14 where the first inboard location is in fluid communication with the edge location via the space in composite laminate 14 associated with the delamination (see block 1504); and curing flowable matrix material 16 infused into the space in composite laminate 14 associated with the edge delamination.

A pressure at the first inboard location may be lowered relative to a pressure at the edge location to draw flowable matrix material 56 from the edge location toward the first inboard location. In some embodiments, the pressure at the first inboard location may be lowered via formed hole 42A extending at least partially through composite laminate 14 from face 18 of composite laminate 14.

Flowable matrix material 16 may be infused into formed hole 42A. Structural pin 44 may extend into hole 42A and flowable matrix material 16 may be infused into passageway 54 defined between a wall of formed hole 42A and structural pin 44. Flowable matrix material 16 infused into hole 42A may be cured while structural pin 44 is in hole 42A.

Some of flowable matrix material 16 having been infused into hole 42A may be detected and infusion of flowable matrix material 16 into the space associated with the delamination in composite laminate 14 may be ceased after having detected some of flowable matrix 16 material having been infused into hole 42A.

In some embodiments, method 1500 may be modified so that flowable matrix material 16 is caused to flow in the opposite direction where flowable matrix material 16 may be infused into edge delamination damage 58 via formed hole(s) 42 and caused to flow toward (and optionally out of) edge delamination damage 58 via edge 56 of composite laminate 14. In such embodiment, one or more zones A, B, C shown in FIG. 11 and coupled to vacuum source(s) 40 may be disposed at edge 56 and the supply of flowable matrix material 16 may be in communication with one or more formed holes 42 via face 18 of composite laminate 14.

FIG. 16 is a flowchart illustrating an exemplary method 1600 for repairing edge delamination damage 58 in composite laminate 14 by infusion of flowable matrix material 16. Method 1600 may be performed using apparatus 60 or a variation of apparatus 60 modified to cause flowable matrix material to flow in the opposite direction. Aspects of method 1500 disclosed above may also be applicable to method 1600 in instances where flowable matrix material 16 is supplied via edge 56 of composite laminate 14. In various embodiments, method 1600 may comprise: infusing flowable matrix material 16 into the space associated with the edge delamination (e.g., edge delamination damage 58) in composite laminate 14 using a pressure differential between a first inboard location (e.g., formed hole 42A in FIG. 11) on composite laminate 14 and an edge location (e.g., edge 56) on composite laminate 14 where the first inboard location is in fluid communication with the edge location via the space in composite laminate 14 (see block 1602); and curing flowable matrix material 16 infused into the space in composite laminate 14 associated with the edge delamination (see block 1604).

Method 1600 may comprise infusing the flowable matrix material 16 into the space via edge 56 as explained above in relation to apparatus 60 and method 1500. Alternatively, method 1600 may comprise infusing flowable matrix material 16 into the space via the first inboard location. Accordingly, method 1600 may comprise lowering a pressure at edge 56 relative to a pressure at the first inboard location (e.g., formed hole 42A in FIG. 11) to draw flowable matrix material 16 from the first inboard location toward edge 56. Flowable matrix material 16 may be infused via formed hole(s) 42A extending at least partially through composite laminate 14 from face 18 of composite laminate 14.

Flowable matrix material 16 may be infused into the space associated with the delamination in laminate composite 14 using a pressure differential between the edge location and a second inboard location (e.g., formed hole 42B) in composite laminate 14 where the second inboard location is in fluid communication with the edge location via the space in laminate composite 14 associated with the delamination. In various embodiments, a pressure at the second inboard location may be lowered so as to draw flowable matrix material 16 from edge 56, or, alternatively, flowable matrix material 16 may be infused into the space via the second inboard location while a pressure at edge 56 is lowered so as to draw flowable matrix material 16 from the second inboard location toward edge 56.

Methods disclosed herein may comprise ceasing to infuse flowable matrix material 16 into the space associated with the delamination in composite laminate 14 using the first inboard location before infusing flowable matrix material 16 into the space associated with the delamination in composite laminate 14 using the second inboard location. In some embodiments, the first inboard location may be substantially hermetically sealed off (e.g., via valve 62A) before infusing flowable matrix material 16 into the space associated with the delamination in composite laminate 14 using the second inboard location. As shown in FIG. 11, the first inboard location (e.g., formed hole 42A) may be at a first distance from edge 56 and the second inboard location (e.g., formed hole 42B) may be at a second distance from edge 56. The second distance may be greater than the first distance.

FIG. 17 is a flowchart illustrating an exemplary method 1700 for infusing flowable matrix material 16 into a space in composite laminate 14. Method 1700 may be performed using apparatus 60 to provide a progressive infusion into delamination damage 58 in a stepwise manner. Aspects of method 1700 may be applicable to other methods disclosed herein. In various embodiments, method 1700 may comprise: supplying flowable matrix material 16 at an inlet location (e.g., inlet port 29, edge 56) in composite laminate 14 where the inlet location is in fluid communication with the space in composite laminate 14 (see block 1702); infusing flowable matrix material 16 into the space in composite laminate 14 using a pressure differential between the inlet location and a first location (e.g., formed hole 42A) in composite laminate 14 where the first location is in fluid communication with the inlet location via the space in the composite laminate 14 (see block 1704); ceasing to infuse flowable matrix material 16 into the space using the first location (see block 1706); infusing flowable matrix material 16 into the space in composite laminate 14 using a pressure differential between the inlet location and a second location (e.g., drilled hole 42B) on composite laminate 14 where the second location is in fluid communication with the inlet location via the space in composite laminate 14 (see block 1708); and ceasing to infuse flowable matrix material 16 into the space using the second location (see block 1710).

In some embodiments, the first location may be at a first distance from the inlet location and the second location may be at a second distance from the inlet location. The second distance may be greater than the first distance.

A pressure at the first location may be lowered relative to a pressure at the inlet location via first formed hole 42A extending at least partially through composite laminate 14 from face 18 of composite laminate 14. Infusion of flowable matrix material 16 into the space in composite laminate 14 using first formed hole 42A may be ceased after some of flowable matrix material 16 has entered first formed hole 42A. In some embodiments, first formed hole 42A may be hermetically sealed off (e.g., via valve 62A) before infusing flowable matrix material 16 into the space in composite laminate 14 using the second location (e.g., second formed hole 42B). Flowable matrix material 16 that has entered first formed hole 42A may be cured while first structural pin 44A is in first formed hole 42A.

A pressure at the second location may be lowered relative to the pressure at the inlet location via second formed hole 42B extending at least partially through composite laminate 14 from face 18 of composite laminate 14. Infusion of flowable matrix material 16 into the space in composite laminate 14 using second formed hole 42B may be ceased after some of flowable matrix material 16 has entered second formed hole 42B. Flowable matrix material 16 that has entered second formed hole 42B may be cured while first structural pin 44B is in first formed hole 42B.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be variations made to these blocks and/or operations without departing from the teachings of the present disclosure. The present disclosure may be embodied in other specific forms without departing from the subject matter of the claims. Also, one skilled in the relevant arts will appreciate that while the apparatus and methods disclosed and shown herein may comprise a specific number of elements/steps, the apparatus and methods could be modified to include additional or fewer of such elements/steps. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

The invention claimed is:

1. A method for infusing a flowable matrix material into a porous region in a composite laminate via a face of the composite laminate, the face comprising an area overlaying a location of the porous region in the composite laminate, the method comprising:

supplying the flowable matrix material to a first portion of the area of the face of the composite laminate;

distributing the flowable matrix material across at least some of the first portion of the area of the face; and while hindering a flow of the flowable matrix material out of the first portion of the area via the face of the composite laminate, drawing the flowable matrix material in the first portion of the area into the porous region and causing some of the flowable matrix material to exit the porous region via a second portion of the area outside the first portion of the area.

2. The method of claim 1, further comprising using a vacuum source to draw the flowable matrix material into the porous region; and facilitating the flow of flowable matrix material exiting the porous region via the second portion away from the second portion.

3. The method of claim 1, further comprising forming a hole through the face of the composite laminate in the first portion of the area defining the location of the porous region, the hole being formed before drawing the flowable matrix material to facilitate the drawing of flowable matrix material into the porous region.

4. The method of claim 3, further comprising providing a structural pin in the formed hole where a passageway for the flowable matrix material is defined between the structural pin and a wall of the formed hole, the structural pin being provided before drawing the flowable matrix material.

5. The method of claim 4, further comprising curing the flowable matrix material drawn into the porous region and that has entered the formed hole, while the structural pin is in the formed hole.

6. The method of claim 1, further comprising detecting some of the flowable matrix material exiting the porous region via the second portion of the area and ceasing the drawing after having detected some of the flowable matrix material having exited the porous region via the second portion.

7. The method of claim 1, further comprising contacting the face of the composite laminate with a sealing member.

8. The method of claim 7, wherein the sealing member extends from a vacuum barrier covering the first portion of the area of the face of the composite laminate, the sealing member circumscribing a sealed area including the first portion of the area of the face.

9. The method of claim 8, wherein the hindering the flow of the flowable matrix material comprises hindering, via a first flow barrier, a flow of the flowable matrix material out of a first side of the first portion of the area via the face of the composite laminate, the first flow barrier being positioned between the first portion of the area and a first outer portion of the area, the first outer portion of the area being outside the first portion of the area and within the sealed area.

10. The method of claim 9, further comprising hindering, via a second flow barrier, a flow of the flowable matrix material out of a second side of the first portion of the area via the face of the composite laminate, the second flow barrier being positioned between the first portion of the area and a second outer portion of the area, the second outer portion of the area being outside the first portion of the area and within the sealed area.

11. A method for repairing a composite laminate by infusion of a flowable matrix material into a porous region in the composite laminate via a face of the composite laminate, the face comprising an area overlaying a location of the porous region in the composite laminate, the method comprising:

infusing the flowable matrix material into a space in the composite laminate through a first portion of the area of the face of the composite laminate and into a passageway in fluid communication with the space, the passageway being defined between a structural pin disposed in a formed hole extending at least partially through the composite laminate, and a wall of the formed hole;

distributing the flowable matrix material across at least some of the first portion of the area of the face;

while hindering a flow of the flowable matrix out of the first portion of the area via the face of the composite laminate, drawing the flowable matrix material in the first portion of the area into the porous region and causing some of the flowable matrix material to exit the porous region via a second portion of the area outside the first portion of the area; and curing the flowable matrix material infused into the space and into the passageway while the structural pin is in the formed hole.

12. The method of claim 11, wherein a ratio of a diameter of the structural pin over a diameter of the formed hole is about ⅔.

13. The method of claim 11, wherein the formed hole and the structural pin extend through two or more plies of the composite laminate.

14. The method of claim 11, further comprising infusing the flowable matrix material into the space in the composite laminate via the passageway.

15. A method for infusing a flowable matrix material into a space in a composite laminate, the method comprising:

supplying the flowable matrix material at an inlet location on the composite laminate, the inlet location being in fluid communication with the space in the composite laminate;

infusing the flowable matrix material into the space in the composite laminate using a pressure differential between the inlet location and a first location in the composite laminate, the first location being in fluid communication with the inlet location via the space in the composite laminate;

ceasing to infuse the flowable matrix material into the space using the first location;

infusing the flowable matrix material into the space in the composite laminate using a pressure differential between the inlet location and a second location in the composite laminate, the second location being in fluid communication with the inlet location via the space in the composite laminate; and ceasing to infuse the flowable matrix material into the space using the second location.

16. The method of claim 15, wherein the first location is at a first distance from the inlet location and the second location is at a second distance from the inlet location, the second distance being greater than the first distance.

17. The method of claim 15, further comprising lowering a pressure at the first location relative to a pressure at the inlet location via a first formed hole extending at least partially through the composite laminate from a face of the composite laminate.

18. The method of claim 17, further comprising ceasing to infuse the flowable matrix material into the space associated with a delamination in the composite laminate using the first formed hole after some of the flowable matrix material has entered the first formed hole.

19. The method of claim 17, further comprising hermetically sealing the first formed hole before infusing the flowable matrix material into the space in the composite laminate using the second location.

20. The method of claim 18, further comprising curing the flowable matrix material that has entered the first formed hole while a first structural pin is in the first formed hole.

* * * * *